United States Patent [19]

Zastrow

[11] Patent Number: 4,691,906
[45] Date of Patent: Sep. 8, 1987

[54] APPARATUS FOR SUPPORTING THE WALLS OF APPLIANCES AND THE LIKE DURING FOAMING

[75] Inventor: Thomas S. Zastrow, St. Paul, Minn.

[73] Assignee: Remmele Engineering, Inc., St. Paul, Minn.

[21] Appl. No.: 725,319

[22] Filed: Apr. 19, 1985

[51] Int. Cl.⁴ .............................................. B23Q 3/00
[52] U.S. Cl. .................................. 269/48.1; 425/110; 425/183; 269/287
[58] Field of Search .................. 425/4 R, 817 R, 110, 425/117, 127, 128, 129 R, 182–183, 190; 264/46.5; 269/287, 47, 48.1

[56] References Cited

U.S. PATENT DOCUMENTS

| | | | |
|---|---|---|---|
| 3,155,751 | 11/1964 | Morris | 425/110 X |
| 3,877,856 | 4/1975 | Valentini | 425/110 |
| 3,880,415 | 4/1975 | Fujioka et al. | 269/48.1 |
| 4,012,186 | 3/1977 | Ramazzotti et al. | 425/817 R X |
| 4,240,999 | 12/1980 | Decker, Jr. | 264/46.5 |
| 4,370,795 | 2/1983 | Reidenbach | 269/48.1 X |
| 4,411,413 | 10/1983 | Reidenbach | 269/48.1 |
| 4,544,340 | 10/1985 | Hehl | 425/183 |
| 4,578,026 | 3/1986 | Hehl | 425/183 X |

FOREIGN PATENT DOCUMENTS 1353466  5/1974  United Kingdom ............... 425/110

*Primary Examiner*—Frederick R. Schmidt
*Assistant Examiner*—Steven P. Schad
*Attorney, Agent, or Firm*—Dorsey & Whitney

[57] ABSTRACT

An apparatus for supporting the walls of appliances and the like during foaming. The apparatus includes a support bed for supporting an appliance or the like during foaming and at least a pair of side support panels which are movable between a retracted position and a foaming position in which they are in supporting engagement with corresponding exterior surfaces of a pair of appliance walls. The apparatus also includes a plug assembly having a plurality of plugs which are selectively positionable for connection with a plug carrier for insertion of the selected plug into the interior of the appliance for foaming and the withdrawal of the plug from the appliance after foaming.

29 Claims, 32 Drawing Figures

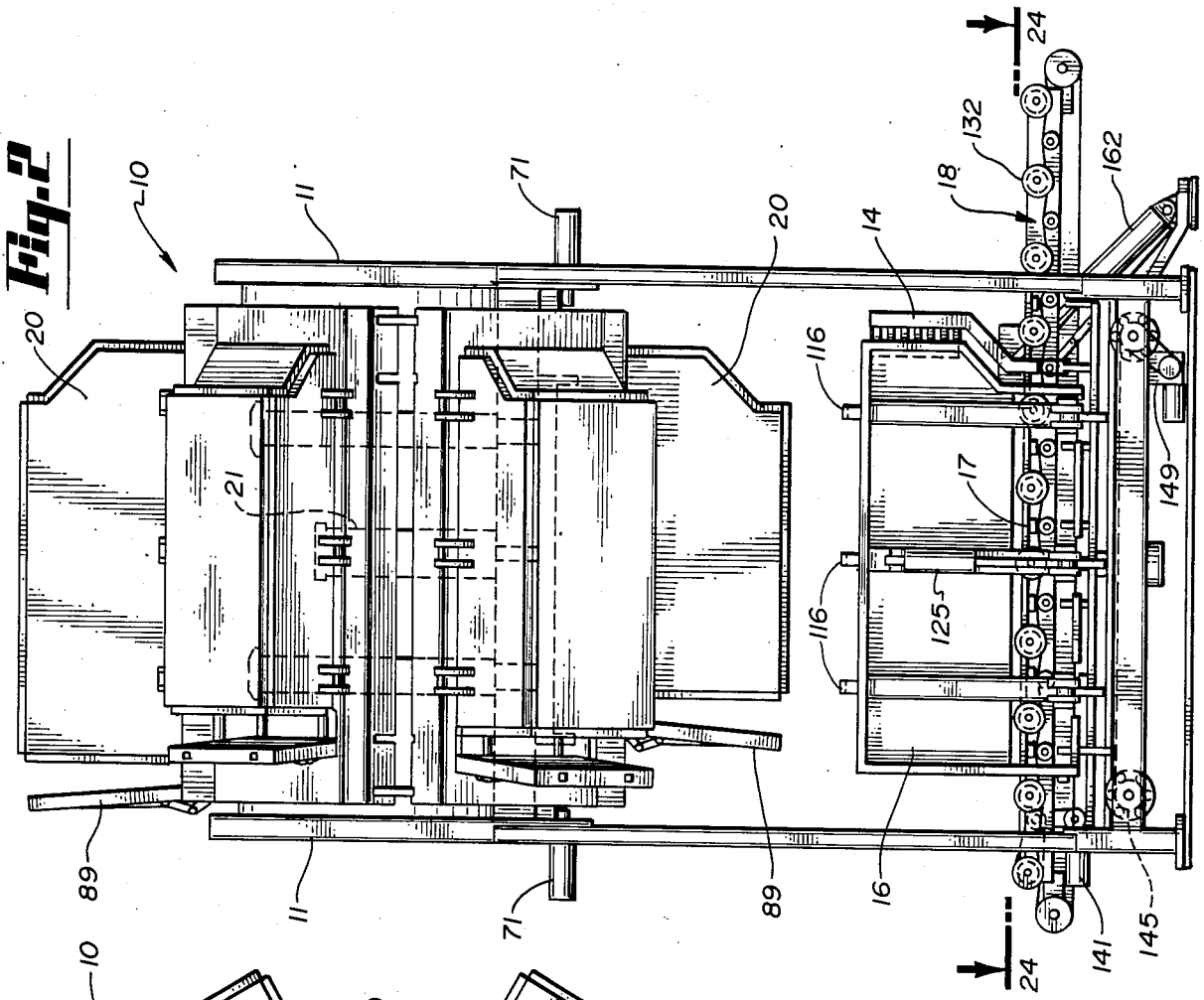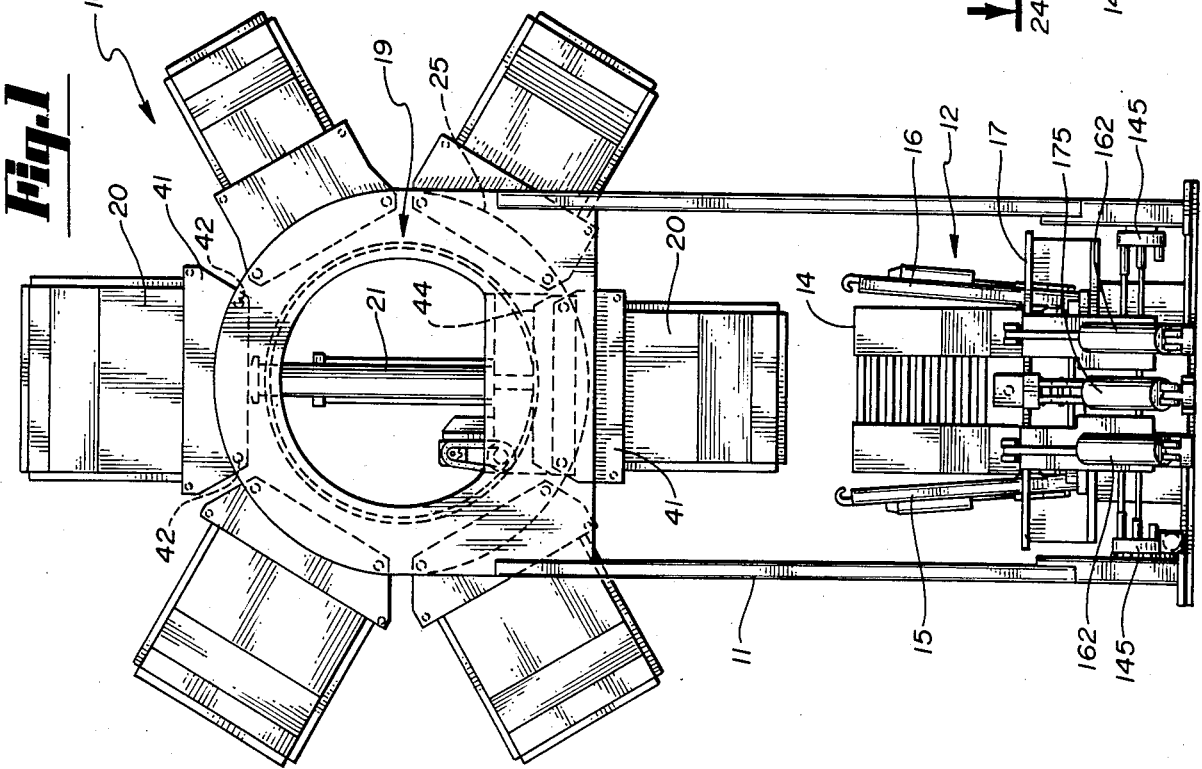

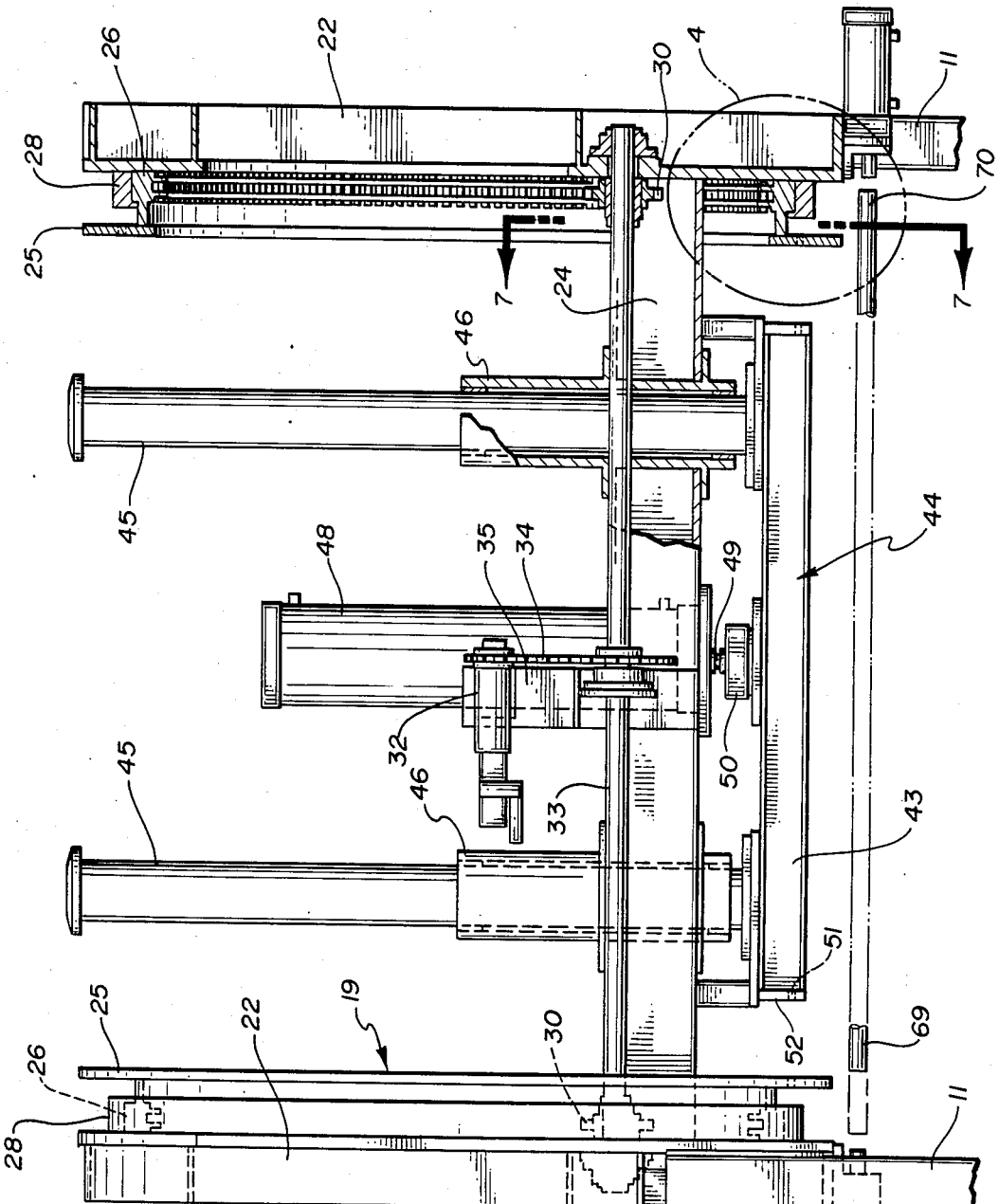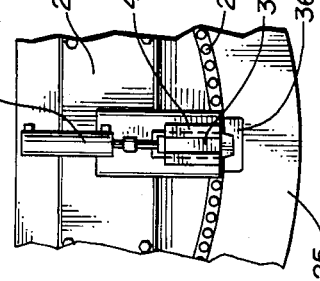

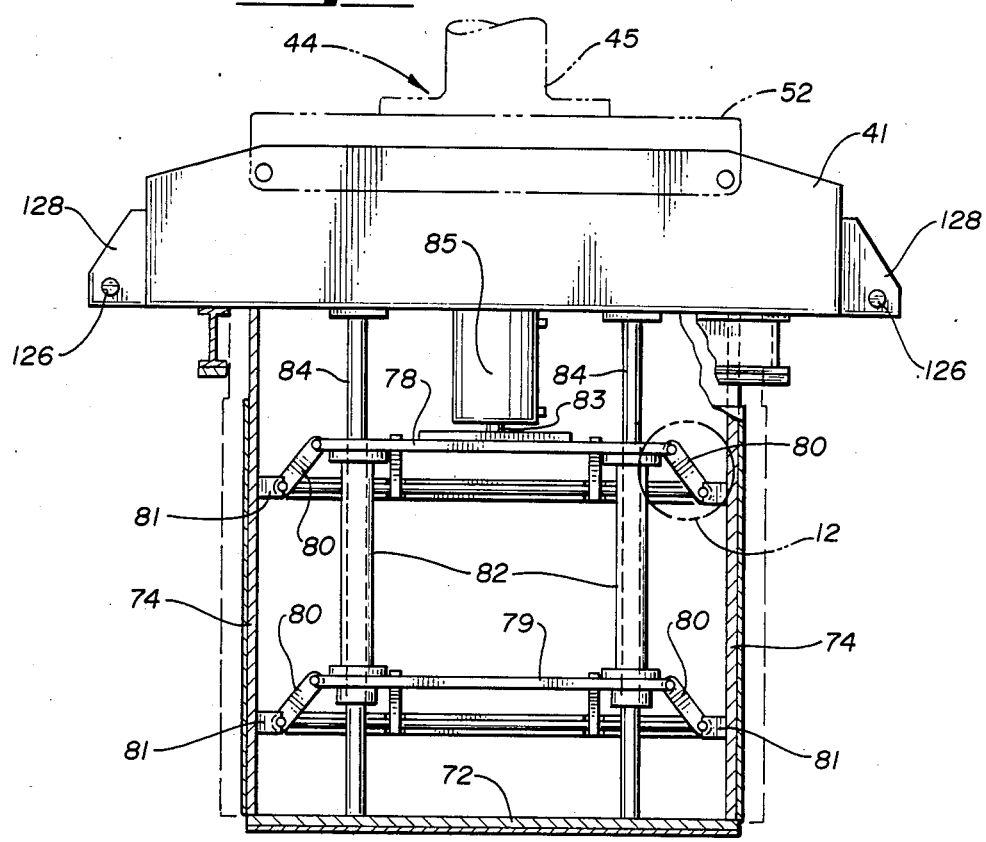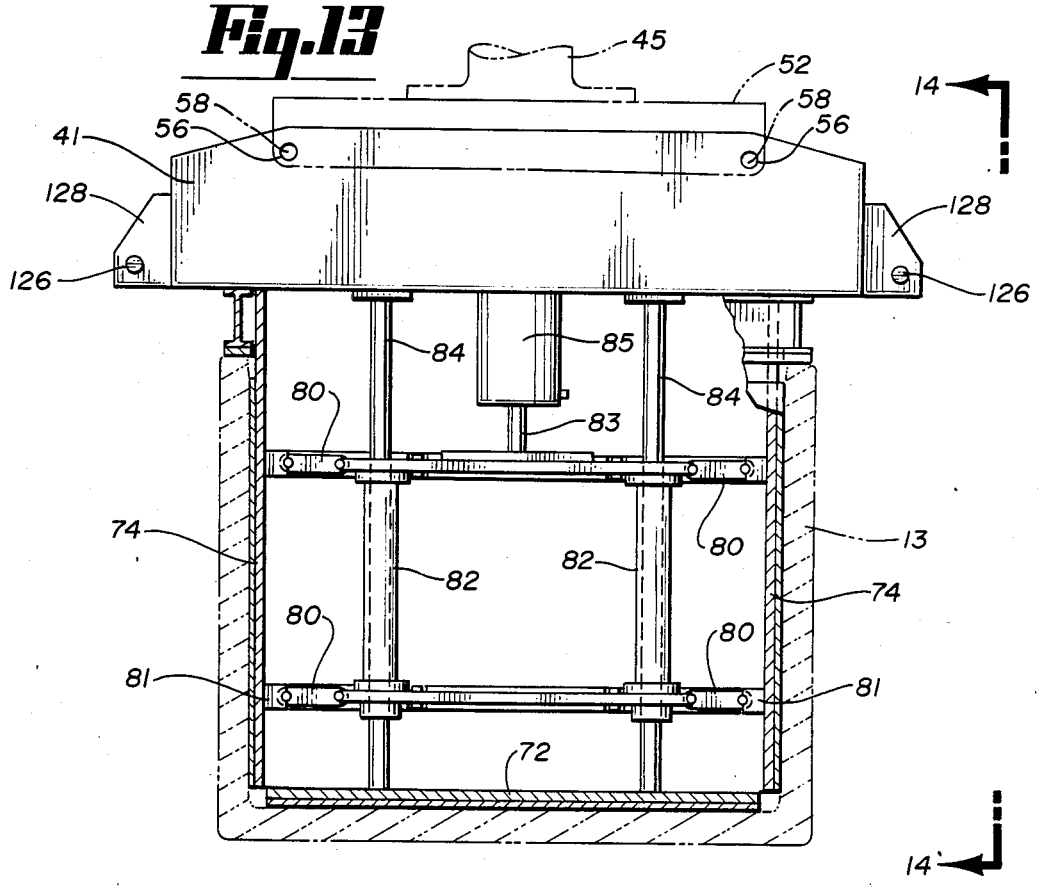

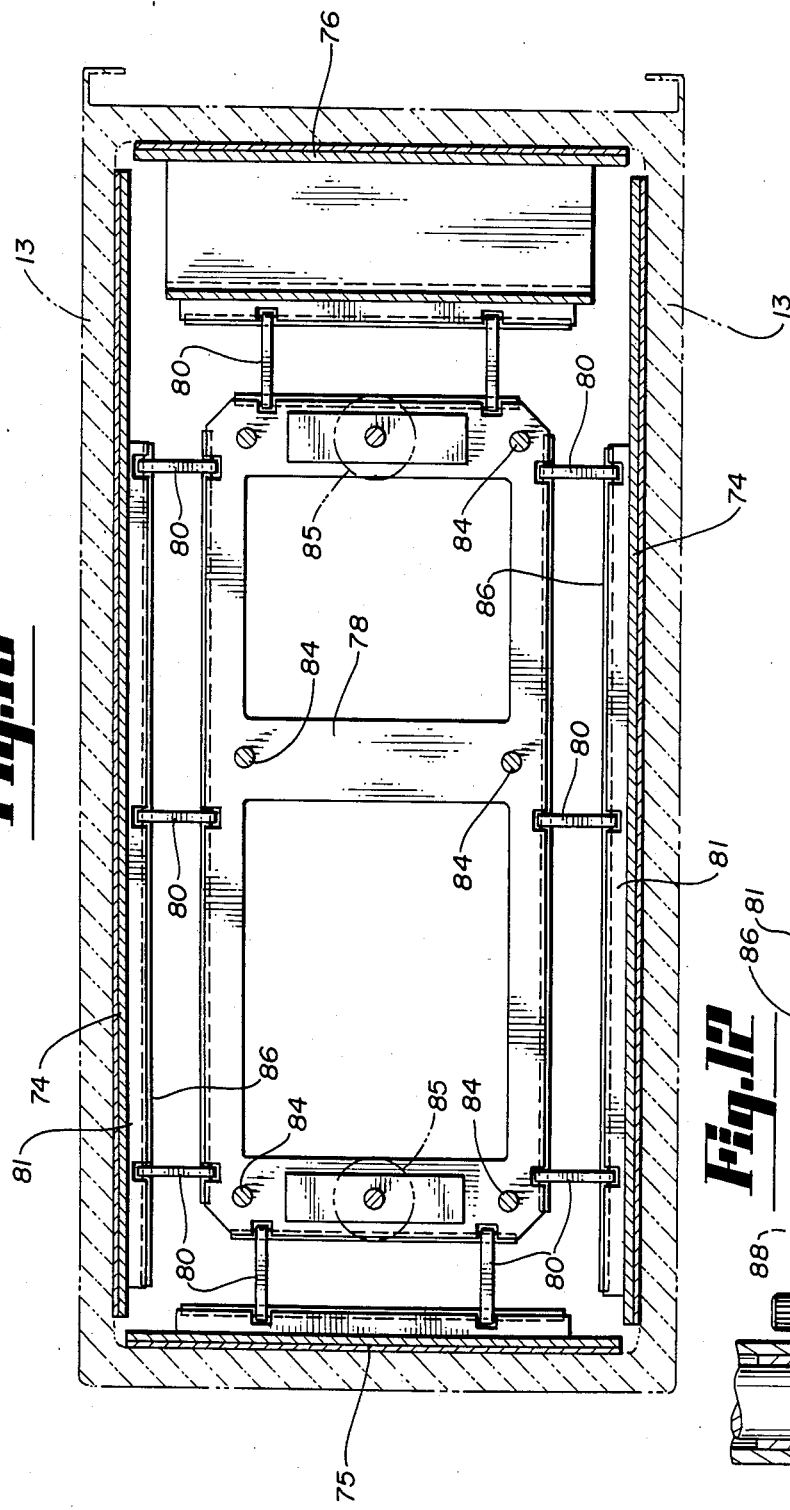
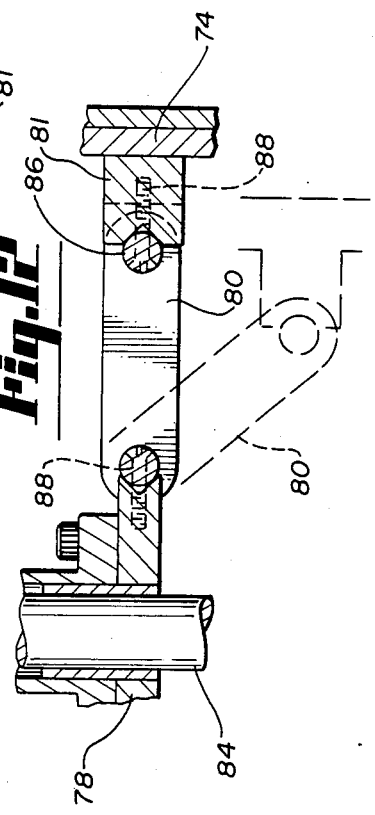

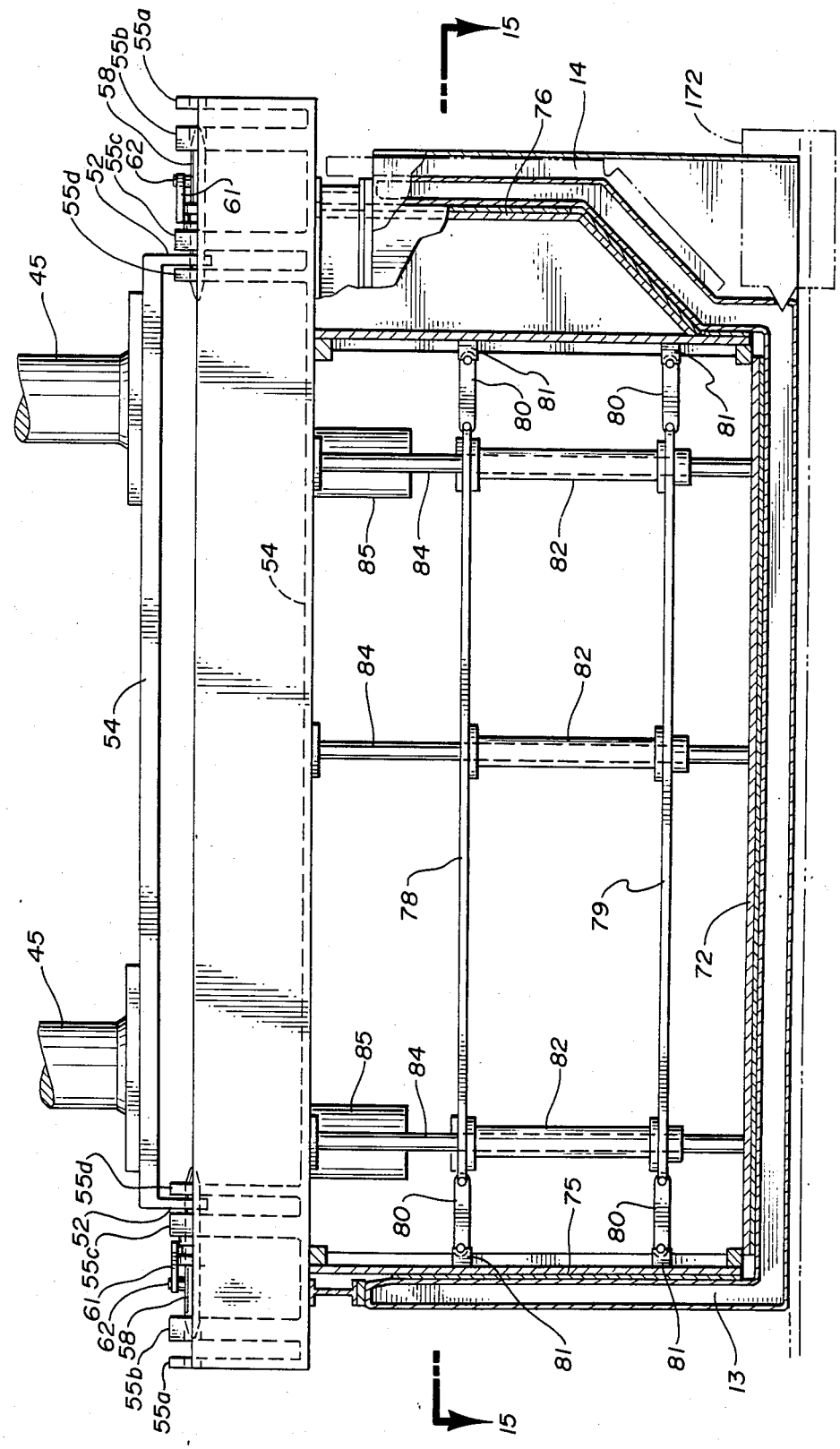

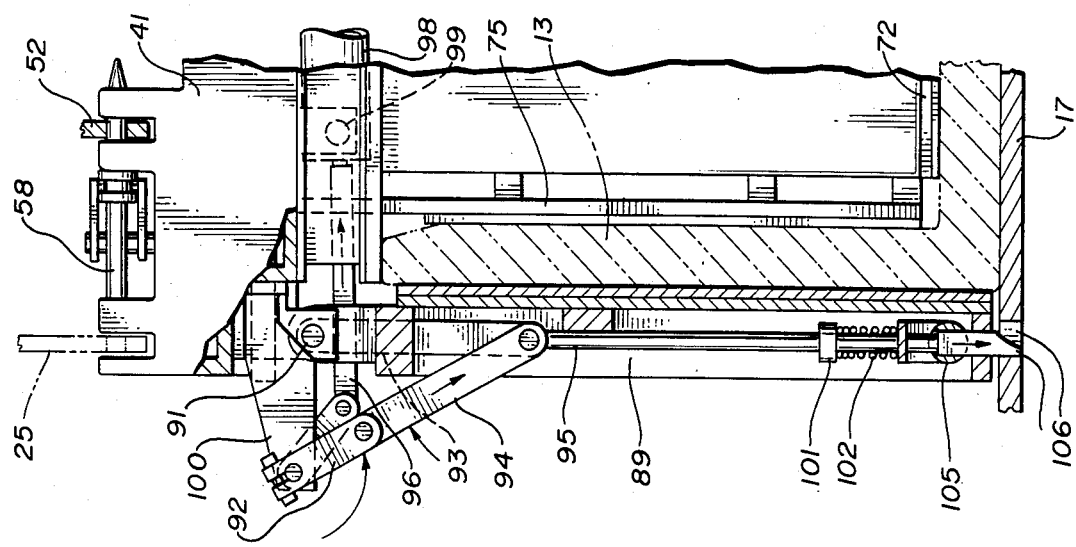
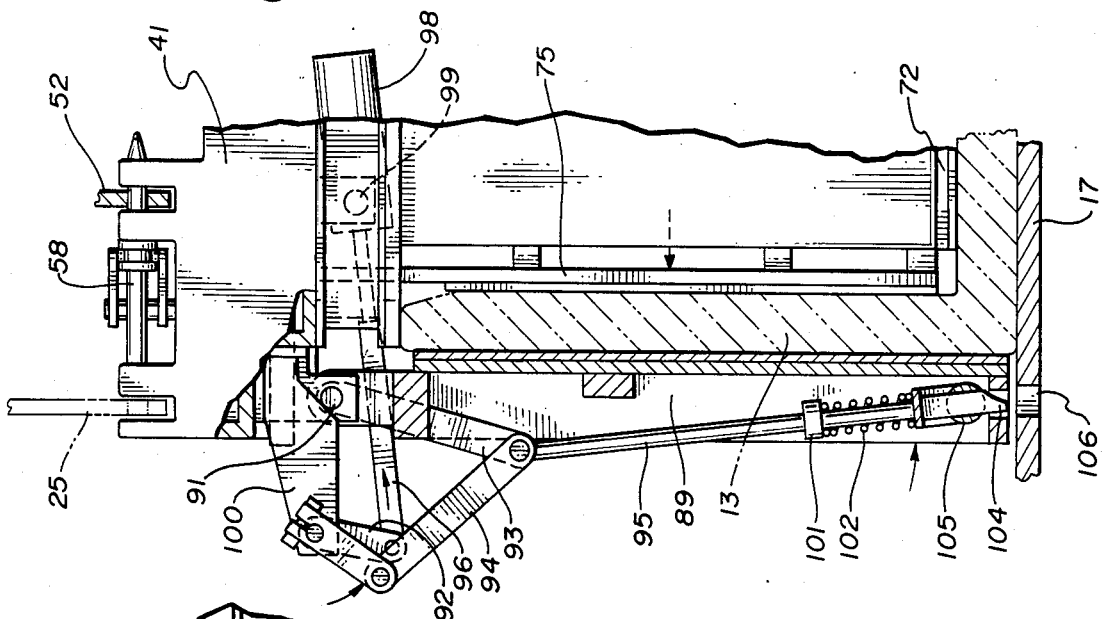
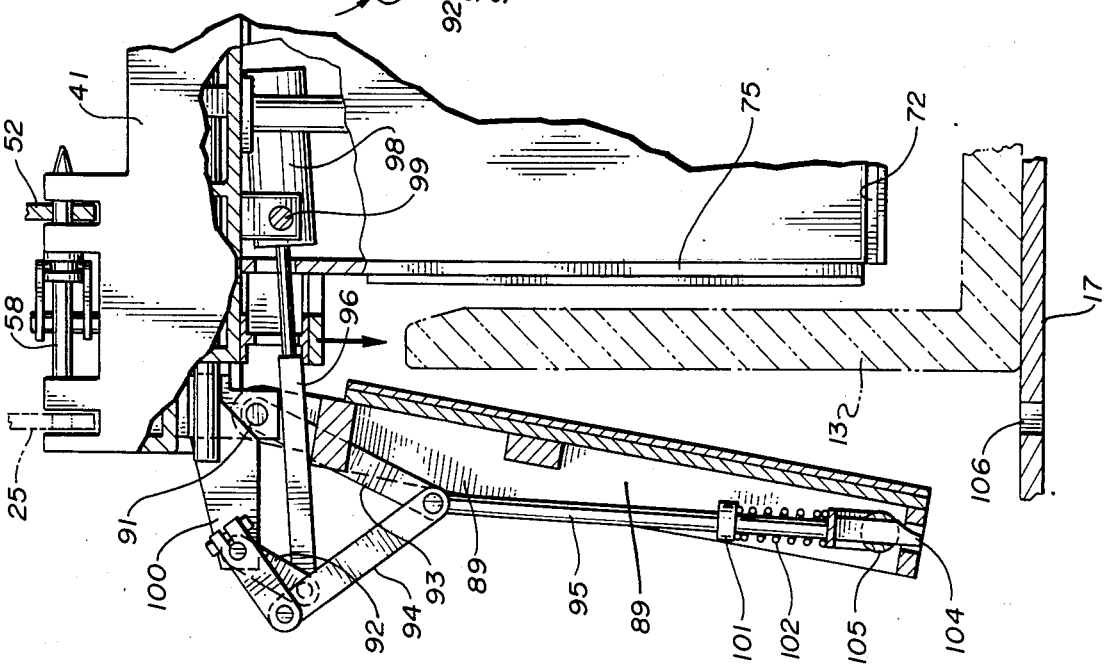

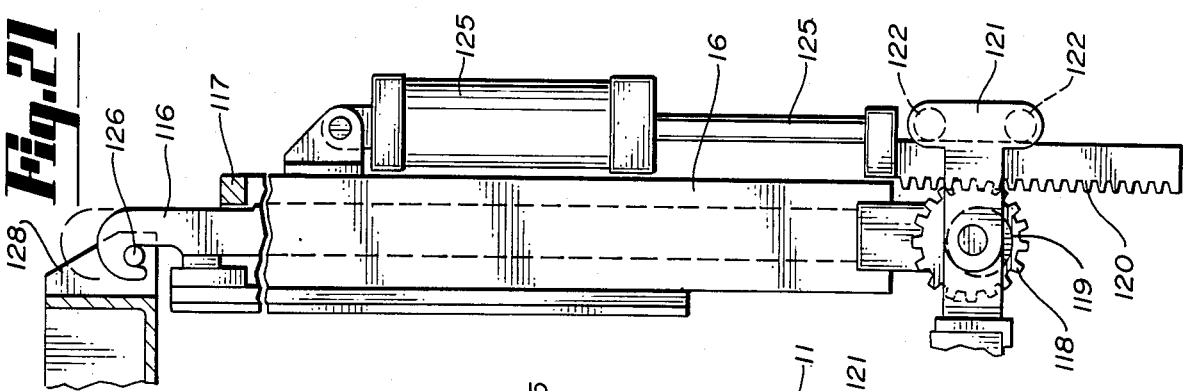
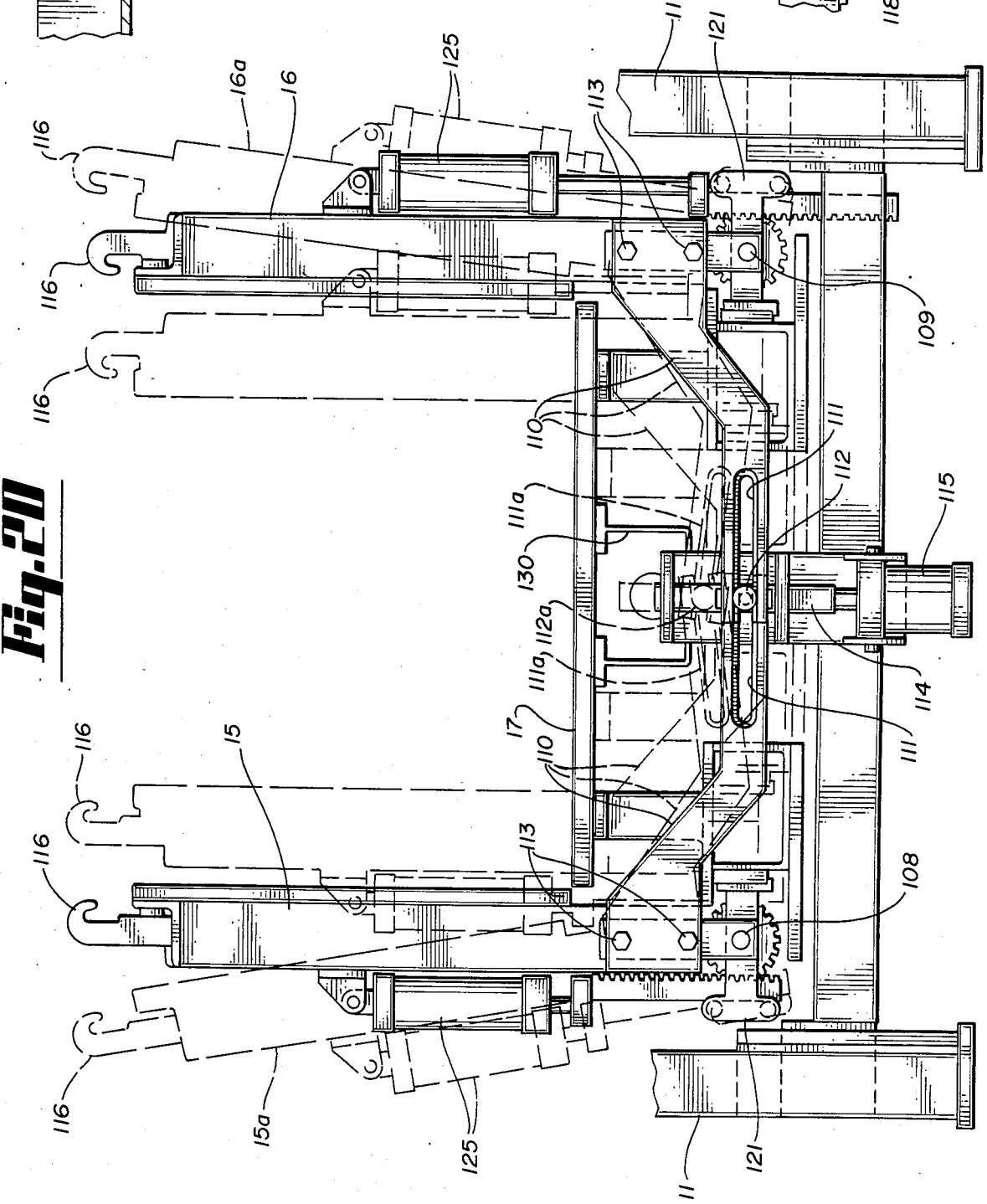

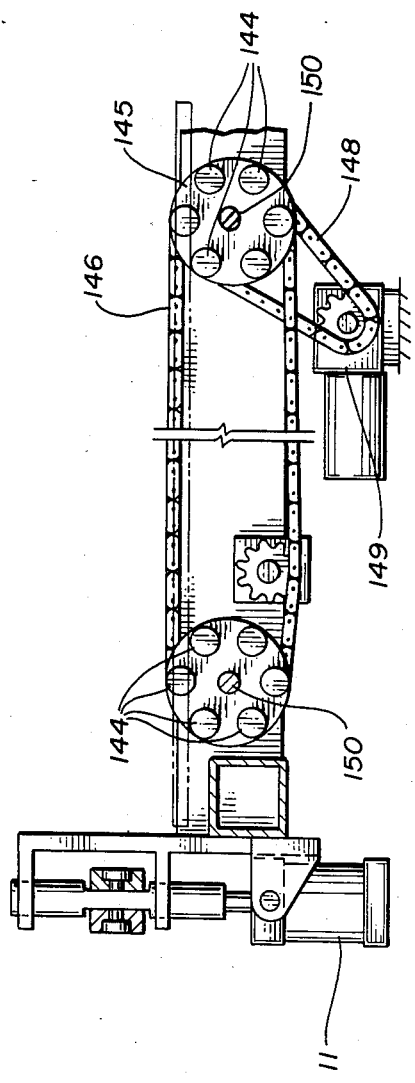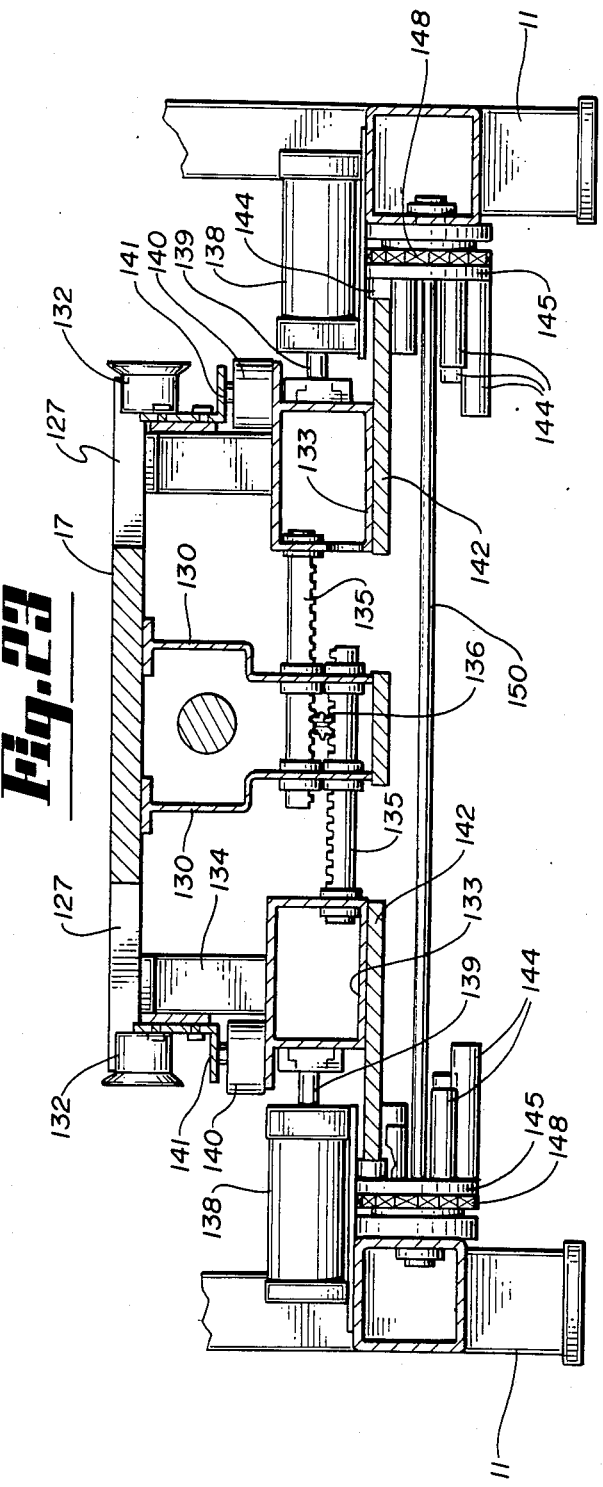

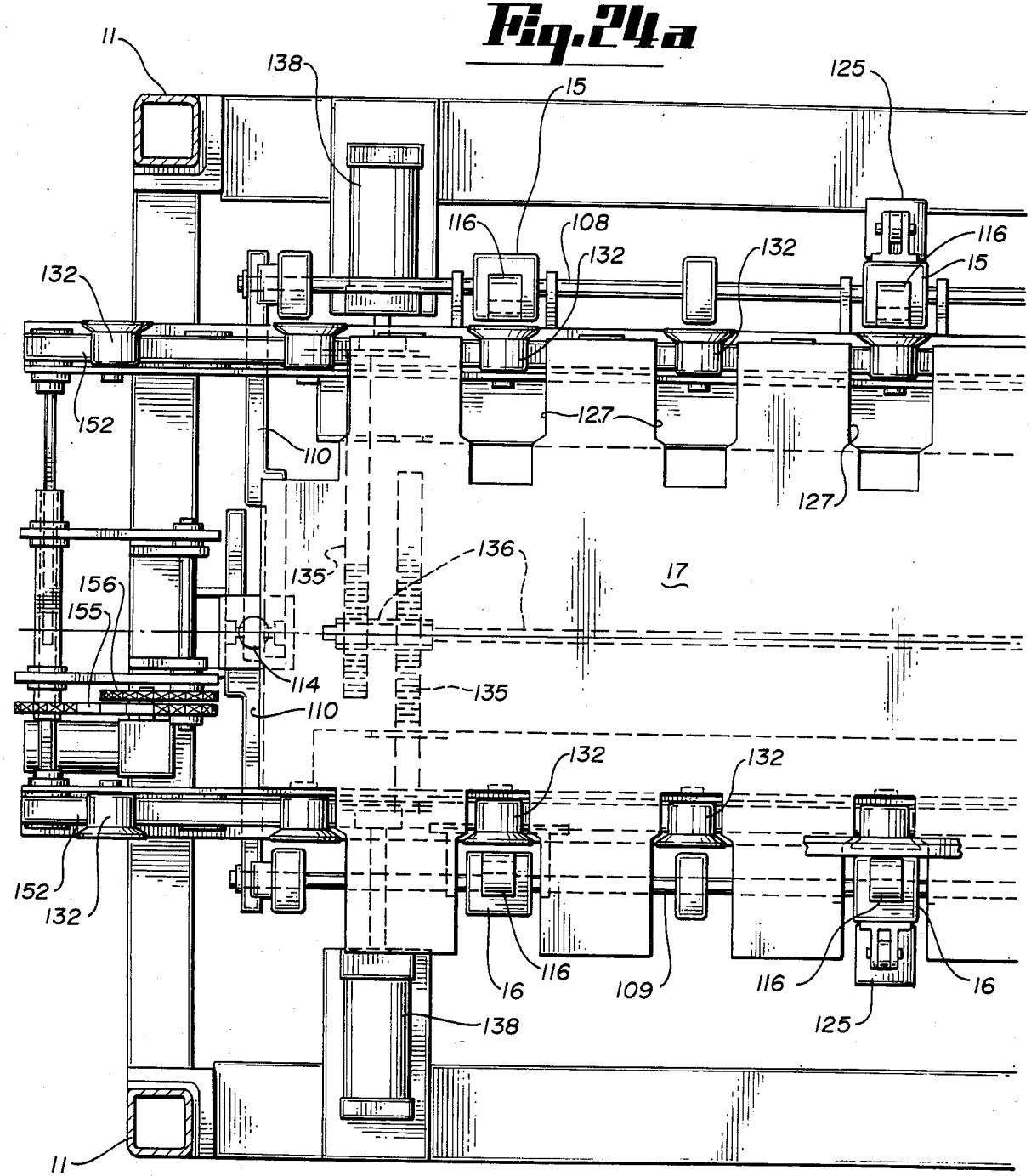
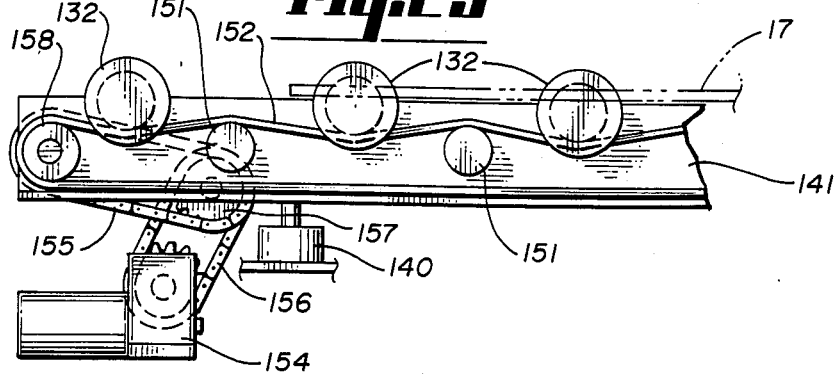

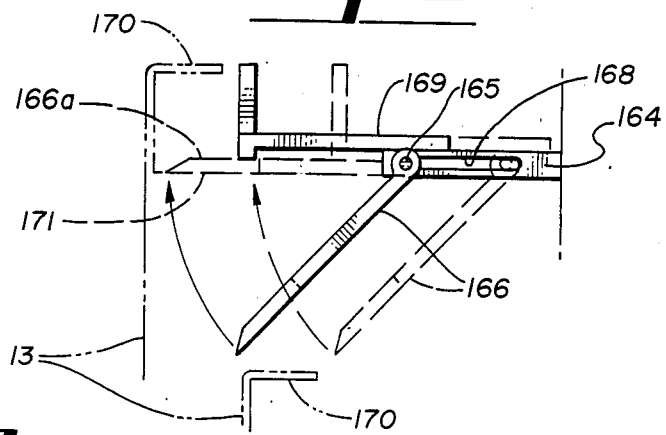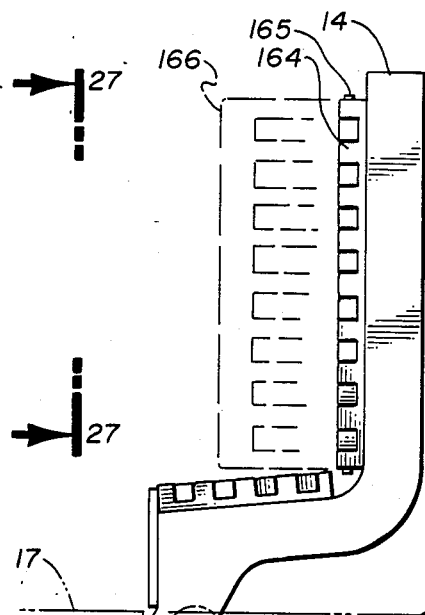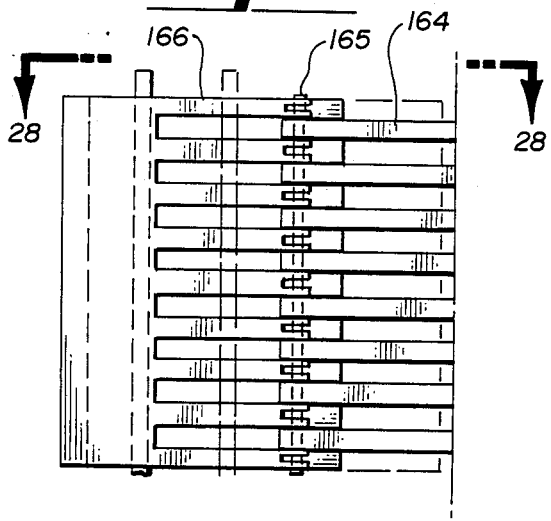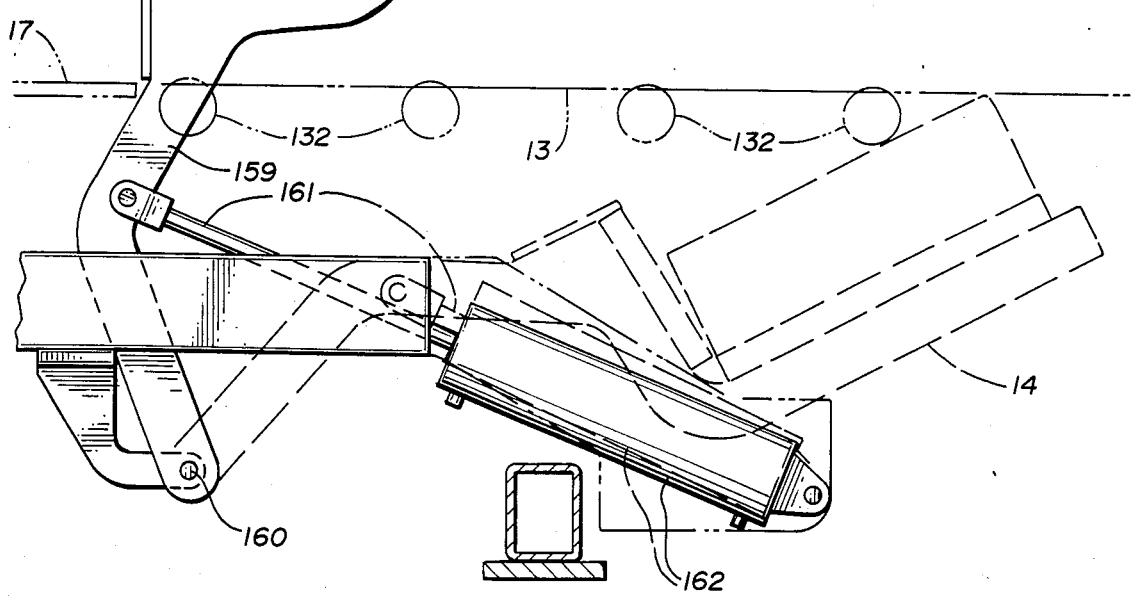

APPARATUS FOR SUPPORTING THE WALLS OF APPLIANCES AND THE LIKE DURING FOAMING

BACKGROUND OF THE INVENTION

The present invention relates generally to an apparatus and method for supporting the walls of appliances and the like during foaming, and more particularly to an apparatus and method for facilitating a quick changeover in foaming different models of appliances such as refrigerators or freezers.

During the manufacture of certain appliances, and particularly appliances such as refrigerators and freezers, the space between the interior and exterior walls of the appliance is filled with an insulating material. This material is commonly urethane foam. During the curing of this injected foam, the foam tends to expand and thus exerts significant pressures on the interior and exterior walls of the appliance. Unless the surfaces of these walls are supported during the curing of the foam, bulges will form in the walls, thereby adversely affecting the appearance of the appliance. To avoid this undesired bulging and distortion of the appliance walls, it is necessary to fully support all of the interior and exterior surfaces of the appliance during the foaming operation.

Presently existing apparatus for foaming appliances and supporting the walls during such process generally includes a plurality of exterior, removable side panels which are adapted for movement into communication with the exterior surfaces of the appliance during foaming. Such apparatus also includes a plug comprising a plurality of interior, removable support panels for insertion into the interior portion of the appliance and for supporting the interior surfaces of the appliance during foaming.

One problem with this current apparatus is that the process of changing from one model of an appliance to another, or from one shape or size of appliance to another, is extremely time consuming. To accommodate such a change, one set of panels must be lifted off or removed from the apparatus and a second set attached. In some cases, this change can be several hours or more. As a result, companies which manufacture appliances such as refrigerators or freezers tend to limit the number of changeovers as much as possible, perhaps every two weeks or so. With smaller companies, or with smaller runs where only a limited number of appliances are foamed, the changeover must occur more often. Because of the time involved, this necessarily increases the overall cost of the appliance.

Although efforts have been made to reduce the changeover time for apparatus of this type, no particular success has thus far been achieved. Accordingly, there is a need in the art for an apparatus and method for supporting the walls of appliances such as refrigerators, freezers and the like during foaming in which the changeover time, from one model to another, is significantly reduced and in which the changeover can be automatically controlled and preprogrammed.

SUMMARY OF THE INVENTION

In accordance with the present invention, and in contrast to apparatus in the prior art, the present invention provides an apparatus and method for supporting the walls of appliances such as refrigerators and the like during foaming in which the changeover time from one model to another can be dramatically reduced from a period of several hours or more to less than one minute. The ability to reduce the changeover time to this extent not only saves a considerable amount of time, both in labor charges and in production time, but also permits the manufacturer to lower his inventory and to do more custom manufacturing of products on an economical basis. The apparatus and method of the present invention also eliminates the need to provide storage space for panels and plugs not being used during a particular foaming operation and also limits the wear and tear on the panels because of repeated assembly and disassembly.

In general, the apparatus of the present invention includes a conveyor for conveying appliances into and out of a foaming position, an exterior panel assembly comprising a pair of exterior side support panels, a foaming or support bed comprising an exterior back support panel which is arranged to accommodate various sizes of appliances and a self-adjusting exterior bottom support panel. The apparatus of the present invention also includes a plurality of different plugs for the various models and sizes of appliances to be foamed. Each of these plugs includes a plurality of support panels for supporting the interior top, bottom, side and back surfaces and the exterior top surface of the appliance during foaming. The interior support panels are expandable between a retracted position and a foaming position in which such panels are in supporting engagement with the interior surfaces of the appliance. The exterior top support panel is similarly movable between a retracted position and a foaming position in which it supports the exterior top of the appliance during foaming.

These plurality of plugs, in the preferred embodiment, are mounted on a turret or other plug storage means. Connection means is provided so that the plugs can be selectively transferred to a plug carrier means for insertion into the interior of the appliance. It is contemplated that any particular manufacturer would most likely have no more than about five or six different interior configurations and sizes for a particular type of appliance. Thus, the normal apparatus would have no more than about five or six plugs.

The present invention also includes indexing means for moving a selected plug into position for transfer from the turret or plug storage means to the plug carrier so that the same can be inserted into the appliance for foaming. Appropriate control means are also provided for coordinating the size adjustment of the exterior bottom support panel, the movement of the exterior side support panels, the selection, insertion and withdrawal of the desired plug, the transport or movement of the appliance being foamed, etc.

In the preferred embodiment, the selected plug is moved downwardly toward the support bed for insertion into the appliance; however, it is contemplated that the novel concepts of the present invention can also be utilized by keeping the plug stationary and moving the support bed and appliance upwardly toward the plug so that the same is inserted into the appliance. In either case, there must be relative movement between the plug and the support bed so as to result in insertion of the plug into, and withdrawal of the plug from, the interior of the appliance.

The method of the present invention includes conveying an appliance into foaming position, sequentially inserting a first of a plurality of plugs prior to foaming and withdrawing such plug after foaming is completed. The method also includes transferring the first plug from a plug carrier to a plug storage means, moving the plug storage means to position a second plug for transfer to the plug carrier and then transferring the second plug to the carrier.

Accordingly, it is an object of the present invention to provide an apparatus and method for supporting the walls of appliances and the like during foaming which dramatically reduces the time needed to changeover from one model or size of appliance to another.

Another object of the present invention is to provide an apparatus and method for supporting the walls of appliances or the like during foaming which includes a support or foaming bed and an exterior panel assembly comprising a pair of exterior side support panels and adjustable exterior bottom and back support panels to accommodate appliances of various sizes.

A further object of the present invention is to provide an apparatus and method for supporting the walls of an appliance during foaming which includes a plurality of plugs selectively positionable for insertion into an appliance for foaming in which each of the plugs includes a plurality of interior support panels and an exterior top support panel.

A still further object of the present invention is to provide an apparatus and method for supporting the walls of an appliance during foaming in which the changeover time from one model of appliance to another can be reduced to less than one minute.

These and other objects of the present invention will become apparent with reference to the description of the preferred embodiment, the drawings, and the appended claims.

DESCRIPTION OF THE DRAWINGS

FIG. 1 is a rear elevational view of the apparatus of the present invention in simplified form.

FIG. 2 is a left side elevational view of the apparatus of the present invention in simplified form.

FIG. 3 is a left side elevational view of the turret assembly and plug carrier with the plugs removed and with other parts cut away and some elements omitted for purposes of clarity.

FIG. 4 is a detail of the shot pin assembly taken from the area circled at 4 of FIG. 3.

FIG. 5 is a front elevational view of the shot pin assembly taken along the line 5—5 of FIG. 4.

FIG. 11 is a front elevational view of the interior of the plug, with portions broken away and a portion of the plug carrier illustrated in phantom.

FIG. 12 is a detail in enlarged scale taken from the area circled at 12 in FIG. 11.

FIG. 13 is a view similar to that of FIG. 11, but with the interior panels in an expanded position.

FIG. 14 is a left elevational view taken along the line 14—14 of FIG. 13 with an appliance in position for foaming and showing the interior panels in an expanded position.

FIG. 15 is a top plan view taken along the line 15—15 of FIG. 14 with an appliance, illustrated in phantom, in position for foaming.

FIG. 16 is a left elevational view of the top exterior panel and the mechanism for locking the same in position for foaming.

FIG. 17 is a view similar to FIG. 16, but in a second position.

FIG. 18 is a view similar to FIGS. 16 and 17, but in a third position.

FIG. 20 is a front elevational view of the exterior side wall support and latch assembly.

FIG. 21 is a front elevational detail of the left side center support latch and left side latch actuator.

FIG. 22 is an elevational view of the detail of the gauging mechanism for controlling width variations for the exterior bottom and side support panels.

FIG. 23 is a front elevational view of the synchronized width variation assembly.

FIG. 25 is a left elevational detail of the appliance bottom support and conveyor system.

FIG. 26 is a left side elevational detail of the exterior bottom support with solid lines illustrating the support in its operative position and phantom lines illustrating the support in its inoperative position.

FIG. 27 is a front elevational detail of part of the means for varying the effective width of the exterior bottom support as taken along the line 27—27 of FIG. 26 and showing only the position to the left of the center line.

FIG. 28 is a top plan view of the detail of FIG. 27 taken along the line 28—28 of FIG. 27.

DESCRIPTION OF THE PREFERRED EMBODIMENT

Figure 6:
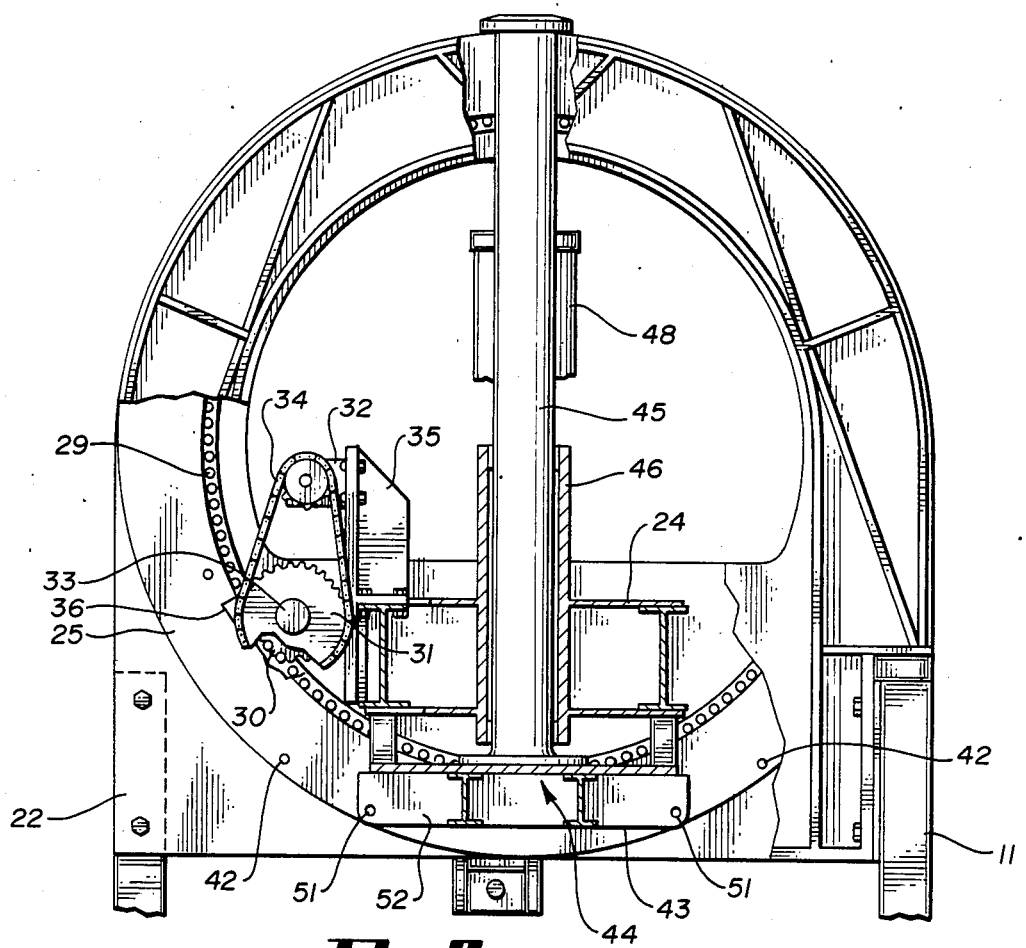
FIG. 6 is a rear elevational view of the upper part of the turret assembly and plug carrier with parts broken away.

Reference is first made to FIGS. 1 and 2 showing the foaming apparatus 10 of the present invention in simplified form. In general, the apparatus 10 includes an apparatus supporting frame structure 11, a foaming bed 12, an exterior support panel assembly and a turret or plug storage and carrier assembly 19. The foaming bed 12 includes a conveyor assembly 18 for conveying appliances or the like into foaming position. The exterior support panel assembly includes a plurality of exterior support panels comprising the bottom support panel 14, a pair of side support panels 15 and 16 and the back support panel or support bed 17. The turret assembly 19 comprises a plurality of plugs 20, means for storing the plugs 20 when not in use and a plug carrier means or assembly 44. The plug carrier means includes the ram mechanism 21 for lowering and raising the plugs 20 between a first or foaming position and a second or non-foaming position, respectively. All of these elements, and their related structures, are supported by the apparatus frame 11.

Figure 7:
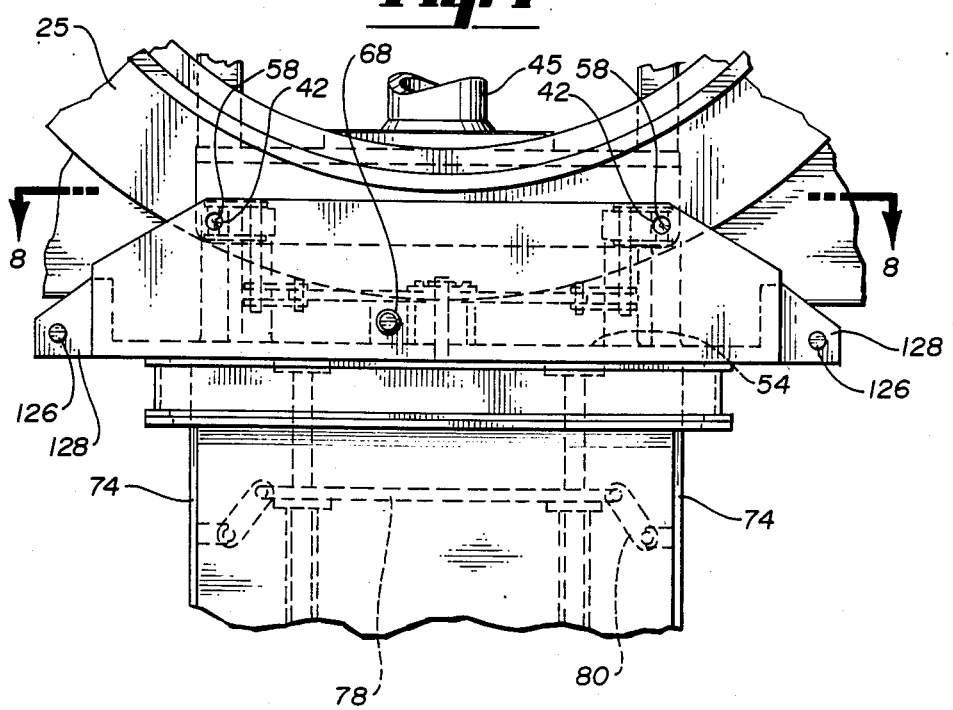
FIG. 7 is a rear elevational detail of a portion of the turret assembly and the plug carrier in position for transfer of a plug between the turret and the plug carrier.

The turret or plug storage assembly 19, illustrated generally in FIGS. 1 and 2 and more specifically in FIGS. 3, 6 and 7, includes a turret support frame 22 positioned at each end for supporting the turret assembly 19 and its related structure. The support frame members 22 comprise a portion of the main supporting frame structure 11 and are connected with a cross spacer or cross frame member 24 extending between the support frames 22.

The turret assembly 19 also includes a pair of laterally spaced, generally annular shaped plug storage or carrier rings 25. These storage rings 25 are each connected with a corresponding, annular gear ring 26 which in turn is supported for rotation by a bearing ring 28. Each of the bearing rings 28, as illustrated best in FIGS. 3 and 4, is connected directly with one of the frame members 22. Thus, the bearings 28 remain stationary with respect to the apparatus frame, while the gear rings 26, and thus the storage rings 25, are permitted to rotate therein. Each of the storage rings 25 is provided with a plurality of connection openings or holes 42 for connection with the plugs during storage in the manner described below.

As shown best in FIGS. 3, 4, 5 and 6, the inside edge of each of the generally annular shaped gear rings 26 includes a plurality of circumferentially spaced pins 29 positioned about the entire inner periphery of the rings 26. These pins 29 are adapted for engagement by the gear teeth of a corresponding sprocket 30. The sprockets 30 are mounted on an elongated shaft 33 which extends the entire length of the apparatus and which is journeled at each end in appropriate bearings mounted to the frame members 22. The shaft 33 also extends through and is joined with a centrally positioned sprocket 31 (FIG. 6). The sprocket 31 is operatively connected, via the chain 34, with the output shaft and sprocket of a turret indexing motor 32. The indexing motor 32 is connected with an indexing motor support bracket 35 which is in turn connected with the cross frame member 24. The shaft 33 is also centrally supported by an appropriate bearing with respect to the cross frame 24.

With this construction, both of the turret drive sprockets 30 are driven by the single indexing motor 32. As understood best with reference to FIG. 6, actuation of the motor 32 and thus rotation of the drive sprockets 30 will result in corresponding movement of the gear rings 26 within their respective bearing rings 28, and thus rotation of the storage rings 25.

The preferred embodiment shows the plug storage rings 25 to be rotatable and of a generally circular configuration. However, it is contemplated that various other equivalent configuration could also be used. For example, the storage rings could be of virtually any configuration (square, triangular, pentangular, etc.) and still be rotatable into a position for transfer to the plug carrier. It is also contemplated that the plug storage means could embody means other than a rotatable means for moving the plug into position for transfer to the plug carrier. For example, the plugs could be stored on support members for movement laterally or vertically into position for transfer. Such movement could be accomplished by a rack and pinion, a chain drive or the like.

Each of the storage rings 25 in the preferred embodiment is provided along its inner periphery with a plurality of indexing or alignment members for engagement by a shot pin 38 (FIGS. 4 and 5) from a shot pin or plunger assembly. In the preferred embodiment, these indexing members comprise an insert 36 connected with an inner peripheral portion of the storage rings 25. Each of these inserts 36 includes a tapered recessed socket portion to accommodate engagement by the tapered shot pin 38.

The shot pin 38 is part of a shot pin or plunger assembly which includes an air actuated cylinder 39 for driving the shot pin or plunger 38 into engagement with the socket of the indexing member 36 and a shot pin guide housing 40 for guiding the pin 38 during its movement between engaged and disengaged positions. The shot pin assembly is connected directly with a portion of the turret support frame 22. As will be described in greater detail below, the purpose of the shot pin assembly and corresponding index inserts 36 is to facilitate the desired positioning or indexing of the carrier rings 25 so that the desired plug member can be rotated to the correct position for transfer to the plug carrier and ultimate insertion into the appliance during the foaming operation.

With general reference again to FIG. 1, it should be noted that each of the plurality of plugs 20 includes a plug base 41 which is adapted for selective connection at each of its ends to either the storage rings 25 or to the plug carrier 44 by connection means comprising a plurality of carrier or shuttle pins 58. The apparatus of the present invention also includes means for transferring a selected plug from the storage rings 25 to the plug carrier 44 for movement or insertion into the interior of the appliance during the foaming operation. The plug carrier designated by the general reference numeral 44 is best illustrated in FIGS. 3, 6 and 7. The plug carrier 44 includes a plug carrier base 43 and is connected near its ends to a pair of elongated guide rods 45. These guide rods 45 are connected with the top surface of the base 43 and extend upwardly through corresponding guide tubes or sleeves 46 which are in turn connected with the cross frame member 24. The function of the guide rods 45 and sleeves 46 is to guide the movement of the plug carrier 44 during its movement between a lowered, foaming position and a raised, non-foaming position. In the preferred embodiment, the rods 45 are guided by the interior surfaces of the sleeves 46. It is contemplated, however, that the sleeves 46 could be provided with rollers or other similar bearing means to assist in the guiding function.

A ram or lift assembly for providing the driving force to move the plug carrier 44, and thus the selected plug 20, between its upper and lower positions includes an air driven lift cylinder 48, a connecting rod 49 and a bracket 50 for connecting the rod 49 with the top surface of the base 43. Although various mechanisms for attaching the connecting rod 49 with the carrier 44 can be utilized, the preferred embodiment contemplates a floating attachment. Such attachment provides some flexibility of movement between the end of the connecting rod 49 and the carrier, while still functioning to transmit forces to the carrier 44 to move the same between its raised and lowered positions.

As illustrated by solid lines in FIGS. 6 and 7, and by broken lines in FIG. 3, each end of the plug carrier base 43 is provided with a carrier flange 52 and each carrier flange 52 is provided with a pair of connection openings or holes 51. The holes 51 are designed and positioned to receive one end of a carrier or shuttle pin 58 for connecting a selected plug to the plug carrier 44.

The connection means for selectively connecting the various plug bases 41, and thus their corresponding plugs 20, to the storage rings 25 or the carrier flanges 52, or for transferring the same from one to the other is illustrated best in FIGS. 7, 8, 9 and 10. Each of the plug bases 41 includes a main plug base frame member 54 to which various operative mechanisms are connected. Extending upwardly from the upper surface of the plug base frame 54, and at each corner, are a plurality of connection tabs or flanges 55a, 55b, 55c and 55d. These flanges are illustrated best in FIG. 9 and are shown to extend upwardly from the frame 54 to straddle the outer peripheral edge of the storage rings 25 and the lower edge of the carrier flanges 52. Specifically, the tabs 55a and 55b straddle the outer edge of the storage rings 25, while the connection tabs 55c and 55d straddle the edges of the carrier flange 52.

Figure 8A:
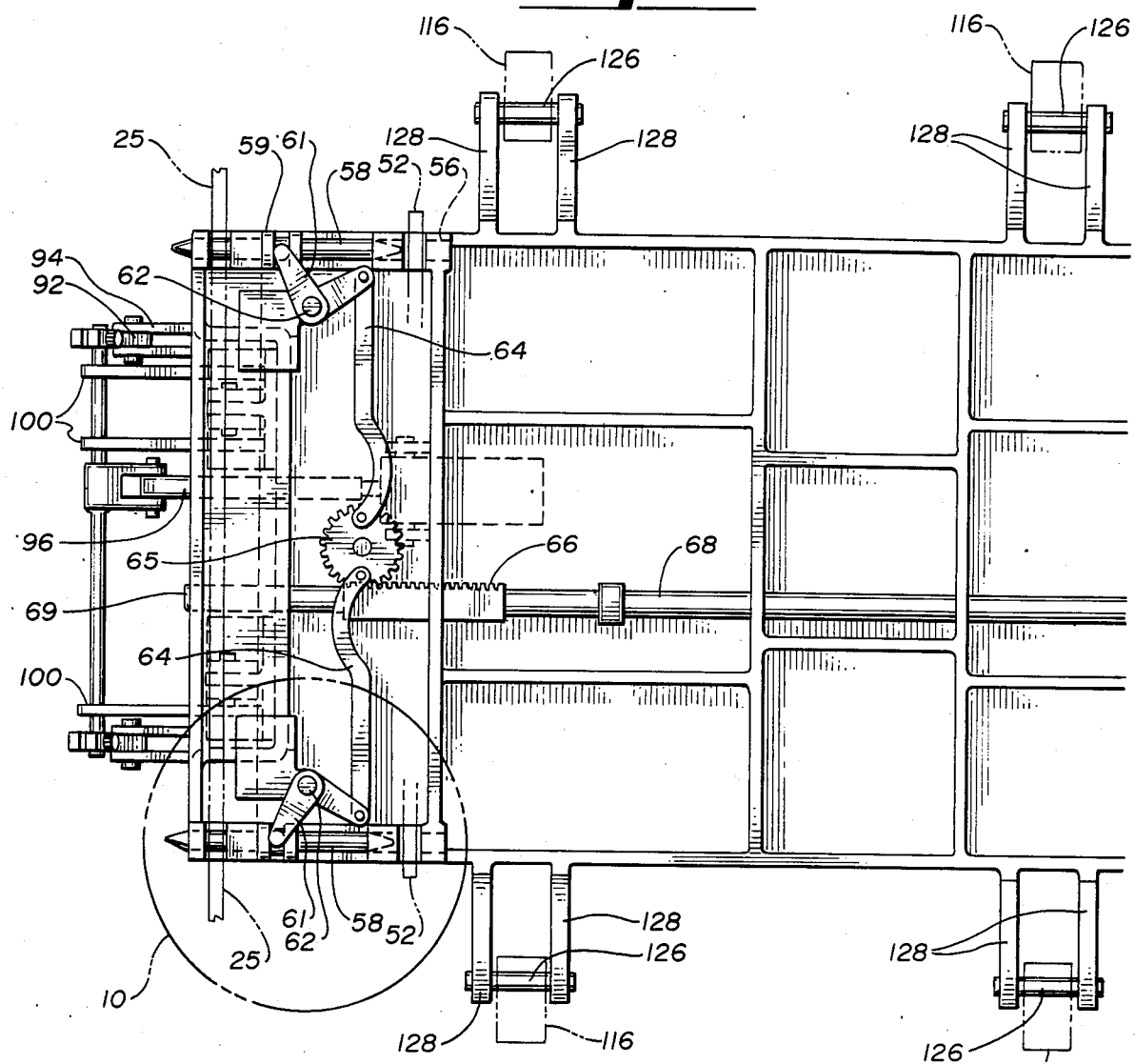
FIG. 8, comprised of Figure portions 8a and 8b, is a top plan section taken along the line 8—8 of FIG. 7 with the turret storage ring and plug carrier flanges shown in phantom.
Figure 9A:
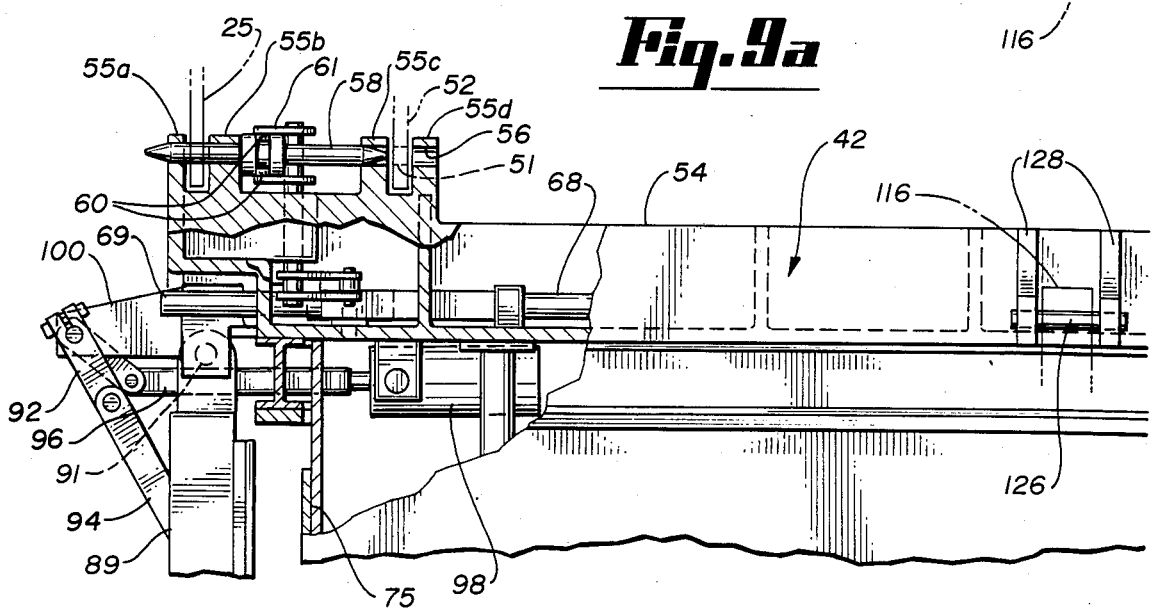
FIG. 9, comprised of Figure sections 9a and 9b, is a left side elevational view of the plug base with the turret storage rings and plug carrier support flanges shown in phantom.
Figure 8B:
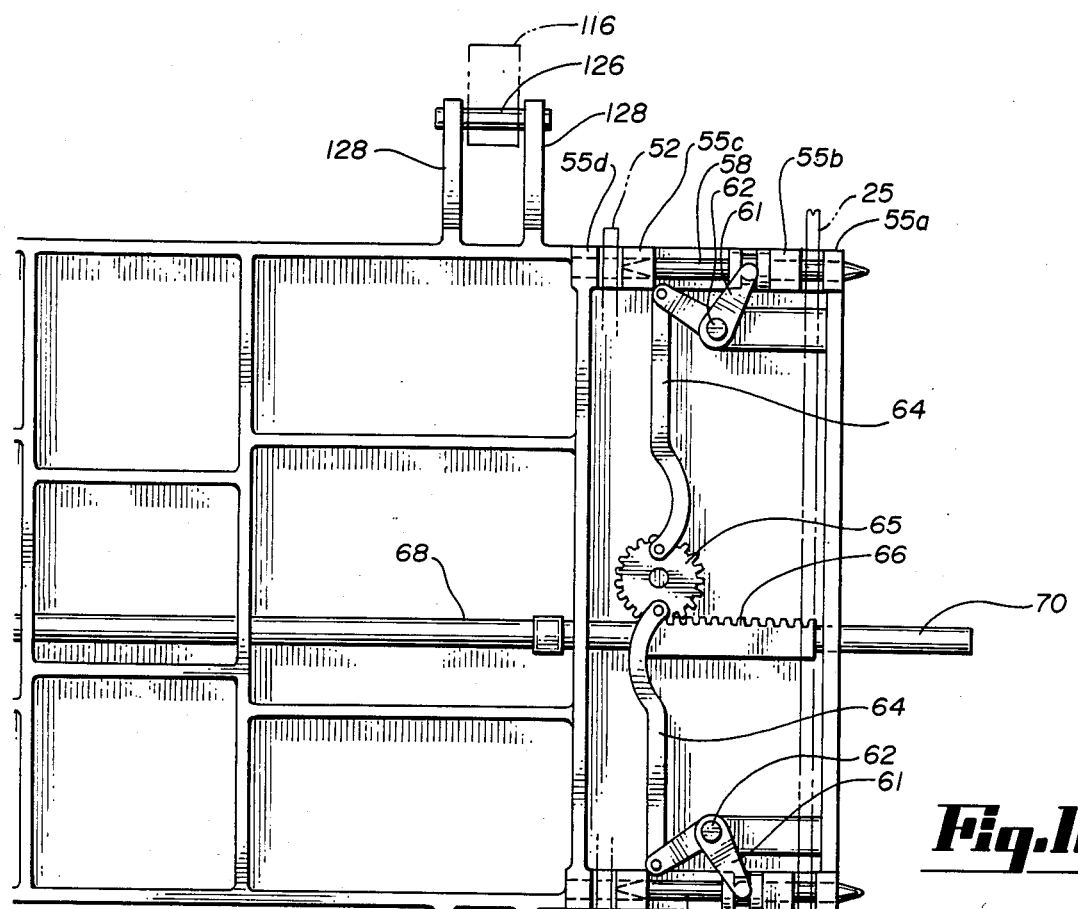
Figure 10:
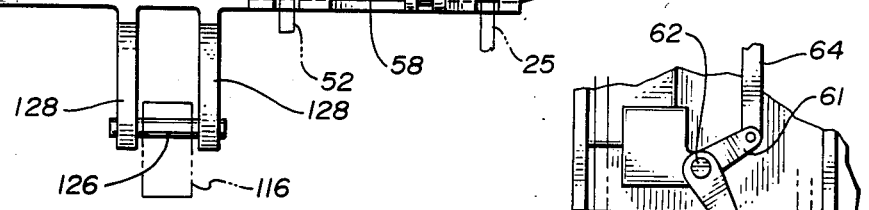
FIG. 10 is a detail top plan view taken from the area circled at 10 in FIG. 8a, except with the carrier pin in a position connecting the plug with the plug carrier.
Figure 9B:
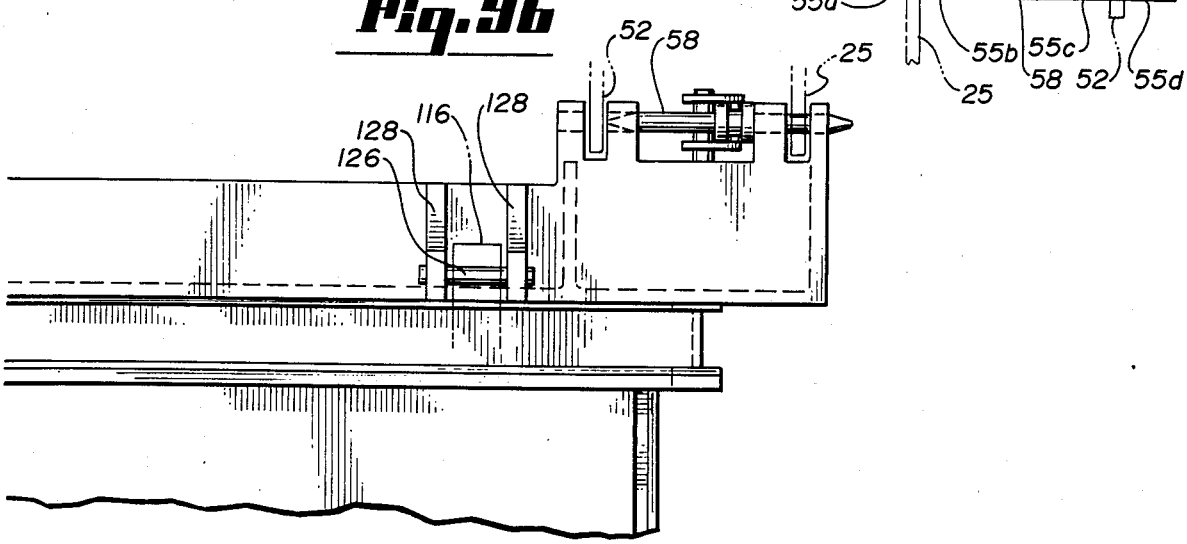

As shown best in FIG. 8 (Figure sections 8a and 8b), a set of connection tabs 55a-55d extends upwardly from each corner of the plug base 41. Each of the connection tabs 55a-55d includes an opening 56 extending therethrough to receive the shuttle or carrier pin 58. The shuttle pin 58 is movable between a storage position in which the plug 20 is connected with the rings 25 as illustrated in FIGS. 8 and 9 and a carrier position in which the plug 20 is connected with the plug carrier 44 as shown in FIG. 10. When in a storage position, the shuttle pin 58 extends through the connection tabs 55a and 55b and thus also through appropriately positioned connection openings 42 (FIGS. 1, 6 and 7) in the storage ring 25, to connect the plug 20 to the storage rings 25 for movement therewith. In the storage position, the opposite end of the shuttle pin 58 does not extend through the opening 56 in the connection tab 55d or the openings 51 in the carrier flange 52. Thus, in the storage position the plug base 41 is totally disconnected from the plug carrier 44.

FIG. 10 is a detailed view of one corner of the upper surface of the plug base showing one of the shuttle pins 58 in a position connecting the plug base 41 with the plug carrier 44. Specifically, the shuttle pin 28 has been moved toward the right (as viewed in FIG. 10) so that the right hand end extends through the flanges 55c and 55d and also through the openings 51 in the carrier flange 52. It should be noted that in this position, the opposite end of the shuttle pin 28 does not extend through the opening 56 in the connection tab 55a or the openings 42 in the storage rings 25. Thus, the plug base 41, and thus the corresponding plug 20, is disconnected from the storage rings 25.

The mechanism for moving the shuttle pins 58 between their two positions and also for synchronizing such movement is shown best in FIGS. 8 and 9. Each of the shuttle pins 58 is provided with a pair of spaced collars 59. Disposed between the collars 59 is a pair of rollers 60 (FIG. 9) mounted on one end of a bell crank 61. The bell crank 61 is pivotally secured to the frame 54 of the plug base 41 at the pivot 62 and is connected, at the end opposite the rollers 60, to a straight line toggle link 64. The toggle link 64, in turn, is connected with a toothed pinion 65 for engagement with a corresponding rack 66. As illustrated best in FIG. 8, such a rack 66 and pinion 65 are located at each end of the plug base 41. Each rack 66 and pinion 65 is associated with a pair of toggle links 64 and corresponding bell cranks 61. The ends of the racks 66 are joined by a connecting rod 68 extending between them. Rod extensions 69 and 70 are also provided on the opposite ends of the racks 66. These ends 69 and 70 function to transfer movement from a pair of shuttle pin actuating cylinders 71, 71 illustrated in FIG. 2. These air cylinders 71, 71 are fastened to the main frame 11 of the apparatus and function to push the rod 68, and thus the racks 66, in one direction or the other. This pushing force is transferred by the ends 69 and 70. It should be noted that the cylinders 71, 71 do not exert any pulling force on the rod 68 (FIG. 8) but only a pushing force. As the racks 66 move from one position to the other, the associated pinion 65 rotates about its pivot point. This in turn moves the toggle links 64 to pivot the bell cranks 61. Such pivoting of the bell cranks 61 results in corresponding shifting of the shuttle pins 58 from one end position to the other.

For example, the plug base 41 in FIG. 8 is shown with the shuttle pins 58 extending through and engaging the storage rings 25. By actuating the cylinder 71 (FIG. 2) on the right hand side of the apparatus, the rod 68 and thus the racks 66 are moved toward the left. This rotates the pinions 65 in a clockwise direction, thereby appropriately pivoting the bell cranks 61 so that they move the shuttle pins out of engagement with the storage rings 25 and into engagement with the carrier flanges 52. If it is desired to transfer a plug 20 from the carrier flanges 52 to the storage rings 25, the air cylinder 71 (FIG. 2) on the left hand side of the apparatus is actuated, thus causing movement of the racks 66, pinions 65, bell cranks 61 and shuttle pins 58 in the opposite direction.

It should be noted that the length of the shuttle pins 58 is sufficiently long to insure that a plug 20 is always supported either by the storage rings 25 or the carrier flanges 52. In other words, as the shuttle pins 58 are moving from one position to another, engagement will always be made with either the storage rings 25 or carrier flanges 52 before fully disengaging the other of these elements.

With reference next to FIGS. 11, 13 and 14, each plug 20 includes an interior back support panel or surface 72, a pair of expandable interior side support panels or surfaces 74, 74 an expandable interior top support panel or surface 75 and an expandable interior bottom support panel or surface 76. Each of the panels 72, 74, 74 and 75 includes a generally flat outer surface for engagement with a corresponding interior surface of the appliance 13 being foamed. The panel 76 has an outer configuration, which is normally not flat, to fit the contour of the appliance interior bottom. To permit the plug to be inserted into the appliance without scratching or otherwise engaging the inner surface of the appliance, it is necessary for the panels 74, 74, 75 and 76 to be retracted during insertion and withdrawal of the plug. When the plug has been fully inserted, these panels must then be expanded to provide the needed support. The means for accomplishing this expansion and retraction includes a pair of frame means or mounting plates 78 and 79 disposed between the various panels and a plurality of toggle links 80 joining the mounting plates 78 and 79 with corresponding panel attachment brackets 81 on the inside surface of the panels.

As illustrated best in FIG. 14, the mounting plates are positioned in a vertically spaced relationship with respect to one another and are retained in that spaced relationship by a plurality (three pairs) of support and guide tubes 82 extending between the plates 78 and 79. These tubes 82 function to maintain the plates 78 and 79 in proper spaced relationship and also function to guide the movement of the plates 78 and 79 upwardly and downwardly along the guide rods 84. Each of the rods 84 is connected at one end to the interior back panel 72 and at the other end to a lower portion of the plug base frame 54. Also connected with a portion of the plug base frame 54 are a pair of plug actuating cylinders 85 (FIGS. 11 and 13). Each of these cylinders 85 includes a connecting rod 83 connected with the upper mounting plate 78 to cause expansion and retraction of the interior panels.

As shown generally in FIGS. 11, 13, 14 and 15 and in detail in FIG. 12, the plates 78 and 79 are joined with the panel attachment brackets 81 by a plurality of toggle links 80 positioned about the periphery of the plates 78 and 79. When the relationship between the toggle links 80 and the plates 78 and 79 is as illustrated in FIG. 11 and as shown by the broken lines in FIG. 12, the panels are in a collapsed or retracted position. This permits the plug to be inserted and withdrawn from the appliance without engaging the interior surfaces. When the plug has been fully inserted, actuation of the cylinders 85 results in downward movement of the plates 78 and 79 relative to the support panels 74, 74, 75 and 76. This movement, in turn, results in pivoting of the links 80 to the position illustrated in FIGS. 13 and 14 and corresponding outward movement of the panels 74, 74, 75 and 76. The toggle links 80 may be pivotally secured in any conventional manner to the plates 78 and 79 and to the attachment brackets 82. In the preferred embodiment, however, the links 80 are pivotally secured to a pivot rod 86 which is in turn connected with the attachment brackets 81 by a plurality of threaded members 88 (FIG. 12).

Following the foaming operation, the retraction of the panels 74, 74, 75 and 76 is accomplished by retracting the actuating cylinders 85. This causes upward movement of the mounting plates 78 and 79 relative to the panels 74, 74, 75 and 76 and corresponding rotation of the toggle links 80 and inward or collapsing movement of the panels. It should be noted that the pivoting of the toggle links 80 is caused by downward movement of the plates 78 and 79 relative to the panels 74, 74, 75 and 76. The panels are prevented from such movement as a result of engagement between those panels and the inner surface of the interior back panel 72. When the plug is withdrawn, initial upward movement of the plates 78 and 79 relative to the panels 74, 74, 75 and 76 causes the panels to be retracted.

It should be noted that the apparatus of the preferred embodiment contemplates use with an appliance in which the side walls are parallel and the top and at least a portion of the bottom wall are parallel. Thus, it is necessary for the panels 74, 74, 75 and 76 to be selectively expandable and retractable to prevent scratching the interior side walls of the appliance. However, if permitted by the interior contour of the appliance, it is not necessary for the plug to have retractable side panels. In fact, a plug with fixed, non-retractable side panels or surfaces would be preferred if it could be inserted into and withdrawn from the appliance without scratching the interior wall surfaces.

Reference is next made to FIGS. 16, 17 and 18 showing the mechanism for swinging the exterior top panel 89 into a closed position and locking the same into the exterior back support 17. FIG. 16 illustrates the plug 20 as it is being inserted into the interior of the appliance 13. It is fully inserted when the interior back panel 72 engages the interior back of the appliance 13. During the time the plug is being lowered to this position, the exterior top panel 89 is in the position illustrated in FIG. 16.

The panel 89 is pivotally secured to a portion of the plug base 41 about the pivot point 91. The panel 89 is maintained in this open position by a toggle linkage comprising the link members 92, 93, 94 and 95 and the cylinder rod 96. The position of the rod 96 is controlled by an air cylinder 98 which is pivotally mounted to the plug base 41 at the point 99. The toggle link 92 is pivotally secured at one end to a portion 100 of the plug base 41 and at its other end to one end of the toggle link 94. The other end of the toggle link 94 is connected to the top end of the rod member 95. A link 93 extends between the upper end of the rod 95 and the pivot 91. The rod 95 is biased upwardly as a result of force exerted between a locking bar guide member 105 connected with the panel 89 and the collar 101 connected with the rod 95. The rod 95 extends downwardly through the guide 105 and terminates at its lower end in the form of a locking bar 104.

When the plug 20 has been fully inserted into the interior of the appliance 13, the panel 89 is closed and latched by actuating the cylinder 98 to retract the rod 96. When this occurs, the rod 96 moves toward the right, as viewed in FIGS. 16, 17 and 18, thus causes counterclockwise pivotal movement of the toggle link 92 and also corresponding inward pivotal movement of the panel 89. During this movement, downward movement of the rod 95 is resisted by the force of the spring 102. In the preferred embodiment, the force of the spring 102 is sufficiently strong to cause the panel 89 to be closed completely into the position illustrated in FIG. 17 as well as to cause the panel 89 to move the appliance 13 into its foaming position if it is out of such position. When the panel 89 has been fully closed to the position illustrated in FIG. 17, further retraction of the rod 96 will cause downward movement of the rod 95, and thus the locking bar 104. This results in insertion of the locking bar 104 into the female latch opening 106 in the exterior back panel 17 to lock the panel 89 securely for foaming.

Figure 19:
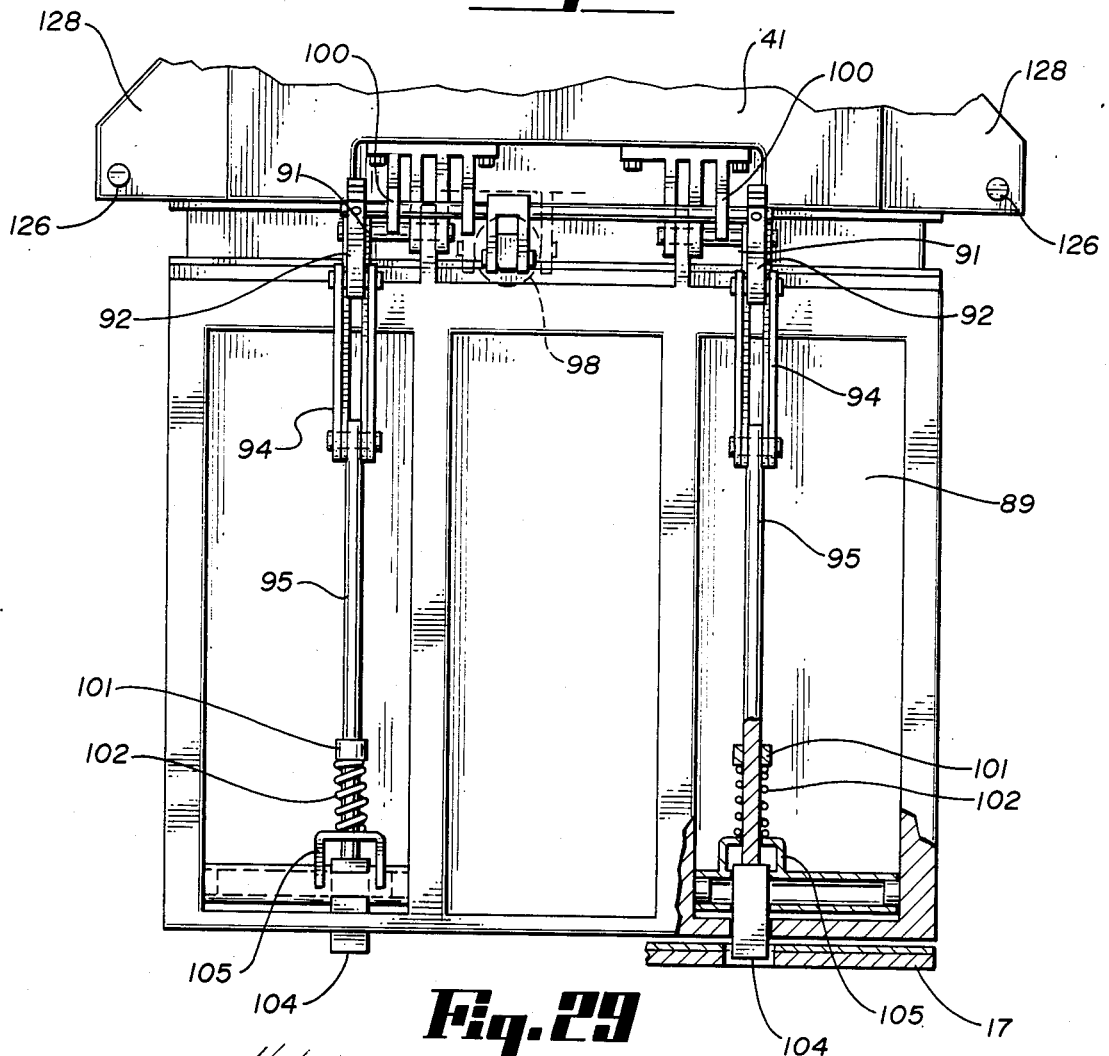
FIG. 19 is a front elevational view of the top exterior panel and mechanism for locking the same in position during foaming.

To open the panel 89 after foaming is complete, the cylinder 98 is again activated so as to extend the rod 96. This movement initially unlocks the locking bar 104 and thereafter pivots the panel 89 outwardly about the pivot 91. As shown in FIG. 19, two closing and latching mechanisms are associated with the panel 89. Both mechanisms are driven by a single air cylinder 98.

Each of the exterior side support panels 15 and 16 are moveable or pivotable between a retracted position and a foaming position in which the support panels are in supporting engagement with the exterior side walls of the appliance. The means for pivoting the side panels 15 and 16 outwardly and inwardly and for latching these panels in position for foaming is illustrated best in FIGS. 20 and 21. With reference to FIG. 20, opposite ends of the side panels 15 and 16 are pivotally secured to a portion of the apparatus frame at the pivot points 108 and 109, respectively. Connected with each of the side wall panels 15 and 16 is a lower lever arm 110 which is securely and rigidly bolted to its respective side wall panel by a pair of bolts 113. Each of these lower lever arms 110 extends inwardly toward the center of the apparatus for operative connection and movement with a vertically movable pin 112. The inwardmost end of each of the lever arms 110 is bifurcated to include an elongated slot 111. The slot 111 is engaged by the pin 112 to transfer vertical movement of the pin 112 to the lever arms 110.

In the preferred embodiment, the pin 112 includes a sliding bushing and is connected with an extension rod 114 and a drive cylinder 115. As a result of actuation of the cylinder 115, the pin 112 is caused to move upwardly and downwardly between the position illustrated in FIG. 20 by solid lines 112 and the position illustrated by broken lines 112a. This movement causes corresponding pivotal movement of the lever arms 110 about the pivots 108 and 109 as a result of engagement with the slots 111. Such pivotal movement of the lever arms 110 in turn causes the side wall panels 15 and 16 to pivot between a closed or foaming position illustrated by the solid lines 15 and 16 and an open or retracted position illustrated by the broken lines 15a and 16a. The pivoting of the side wall panels 15 and 16 outwardly to the positions 15a and 16a moves the panels 15 and 16 away from the appliance being foamed and allows the appliance to be conveyed into and out of the foaming station between foaming operations. It is also contemplated that vertical movement of the pin 112 could be accomplished by rotation of a pin support in which the pin 112 is eccentrically connected with such support. This would have the advantage of providing deceleration and greater force at the end of each opening and closing stroke.

The upper end of each of the side wall panels 15 and 16 includes a latch hook 116 for latching connection with a latch pin 126 disposed between a pair of latch brackets 128. The latch brackets 128 are integrally connected with the frame of the plug base 41. The lower end of the elongated latch hook 116 extends downwardly through a hollow portion 117 (FIG. 21) of the side wall panels 15 and 16 and is connected with an eccentric shaft 119 so that rotation of the shaft 119 results in vertical movement of the latch hook 116. The eccentric 119 is associated with the pinion 118 which is pivotally secured to the side panel mounting brackets 121 and is driven by a longitudinally movable rack 120. The rack 120 is connected with the connecting rod 24 which is in turn connected with the latch cylinder 125. A pair of retaining rollers 122 are mounted between each pair of mounting brackets 121 to retain the rack 120 in engagement with the pinion 118. The mounting brackets 121, and thus the lever arms 110 and the side wall panels 15 and 16 are connected with the frame portions 133.

In the preferred embodiment, there are three pairs of latching brackets 128 and latching pins 126 on each side of the plug base 41 (FIG. 8). Accordingly, there are also three latch hooks 116 associated with each of the side panel members 15 and 16 for connection with the latch pins 126. The three latch hooks 116 are driven by a single rack 120 and pinion 118 associated with each of the side panels 15 and 16 and an eccentric shaft 119 extending the entire length of the side panels 15 and 16. Each of the panels 15 and 16 is provided with a flat, inner surface for supporting engagement with the exterior side walls of the appliance.

FIGS. 22, 23 and 24 illustrate the mechanism for changing the width of the foaming bed so that appliances of different widths can be accommodated. FIG. 23 is an end view of a portion of the apparatus showing the foaming bed or exterior back support 17 and the mechanism for varying the effective width of this support. The exterior back support 17 is supported in part by the stationary back support members 130 which are operatively joined with the main frame of the apparatus and in part by the adjustable or movable support members 134. Each of these support members 134 is joined with a lower frame portion 133 which is mounted with respect to the main apparatus frame for lateral movement with respect to the longitudinal center of the apparatus. This lateral movement of the frame members 133 is driven by the size adjustment air cylinders 138 which are connected with the frame portions 133 by appropriate connecting rods 139.

Connected with the inner end of the frame portions 133 is a rack 135 extending inwardly toward the longitudinal center of the apparatus for engagement with an elongated synchronizing pinion 136. As illustrated best in FIG. 24 (comprising Figure sections 24a and 24b), a size adjustment cylinder 138 and corresponding frame members 133 are located at each corner of the apparatus. Similarly, a pair of rack members 135 are positioned at each end of the apparatus for engagement with the pinion 136 which extends the entire length of the apparatus to provide synchronization of the movement of the various frame portions 133.

Connected with a lower portion of the frame section 133 is a size adjustment positioning rod 142. Such a rod 142 is rigidly secured to each of the frame sections 133 and includes an end which extends outwardly therefrom for engagement with a size adjustment positioning stop member 144. As shown best in FIGS. 22 and 23, a plurality of stop members 144 are on a generally circular turret 145. Each of the members 144 extends inwardly toward the center of the apparatus and is of a different length to correspond with the different sizes of the appliances being foamed. The lateral position of the frame portions 133, and thus the various other structural elements connected with the portions 133, is determined by engagement between the positioning rod 142 and the particular size positioning stop member 144. In FIG. 23, the positioning rod 142 is engaged with the shortest of the positioning stop members 144. Thus, the frame portions 133 and the operative mechanisms connected to it are shown in their outermost position. If the turret 145 is rotated so that a longer one of the size adjustment stop members 144 is positioned for engagement with the rod 142, the entire frame section 133 and supported mechanisms would be positioned inwardly from where they are shown in FIG. 23.

To make this adjustment, the cylinders 138 are actuated to move the frame portions 133 inwardly to the innermost position. The turret 145 is then rotated to a position in which the stop member 144 of desired length is positioned for engagement by the rod 142. The cylinders 138 are then retracted so that the frame portions 133 move outwardly until the rod 142 engages the desired stop member 144.

FIG. 22 illustrates the mechanism for rotating the turrets 145. Specifically, a turret of the type described above is positioned at each corner of the apparatus. One of the turrets 145 is driven by an appropriate indexing motor 149 and a connecting link chain 148. The other turrets 145 are then driven in synchronized fashion by the chain member 146 extending between turrets on each side of the apparatus. Turrets on each end of the apparatus are supported on a common indexing turret shaft 150. As illustrated in FIG. 24 showing an elevational top view of the foaming bed, a plurality of recessed or cut out portions 127 provide clearance for the rollers 132 and the support portions for the side panel members 15 and 16.

Because each of the mounting and support elements of the side panel members 15 and 16 is indirectly connected with and supported by the frame portions 133, movement of the frame portions 133 will cause corresponding movement of the side wall panels 15 and 16. Thus, as the frame portions 133 are caused to move inwardly and outwardly by actuation of the air cylinders 138, the respective position of the side panel members 15 and 16 is changed as well. As illustrated best in FIG. 23, the frame portions 133 also support a plurality of air cylinders 140 which in turn are operatively connected with a roller mounting bar 141. The roller mounting bar 141 has a generally L-shaped cross-sectional configuration and extends the entire length of the apparatus. As illustrated in FIGS. 23 and 24, a plurality of appliance support rollers 132 are rotatably mounted onto the bar 141 to support the appliance during movement into foaming position and during movement from the foaming bed after foaming has been completed. As will be described in greater detail below during the discussion of the operation of the system, the existence of the air cylinders 140 permits the entire set of rollers 132 to be raised or lowered to thereby engage or disengage the appliance which it is transporting.

FIG. 25 illustrates a portion of the conveyor mechanism and the means for driving the same. Specifically, each of the support rollers 132 is driven as a result of engagement between a bottom surface of the rollers 132 and an endless belt member 152 extending around a pair of end pulleys 158. Positioned between adjacent rollers 132 is an idling roller 151 having a belt engaging surface positioned above the lower belt engaging surface of the rollers 132. These idling rollers 151 urge the belt 152 into driving engagement with the rollers 132. The idling rollers 151, like the support rollers 132 and the end pulleys 158, are pivotally secured to the roller mounting bar 141. The pulley 158 on one end of the apparatus is driven by an appropriate conveyor motor 154 which is connected therewith by a pair of drive belts or chains 155 and 156 and an intermediate drive sprocket 157.

FIGS. 26, 27 and 28 and Figure section 24*b* show the exterior bottom support panel, the size adjustment feature for it, and the means for retracting the same so that it can be positioned into engagement with the exterior bottom surface of the appliance. Most appliances for which foaming is required include a bottom edge portion having an inwardly extending flange 170 (FIG. 28). Such flange 170 extends inwardly and below the bottom surface 171 of the appliance which must be supported during the foaming process. To provide this support, it is necessary for the apparatus to include an exterior bottom support panel which is collapsible, to the extent needed to permit the support panel to pass the lower flange 170, but which is then expandable to permit it to support the entire bottom surface 171 of the appliance.

Figure 24B:
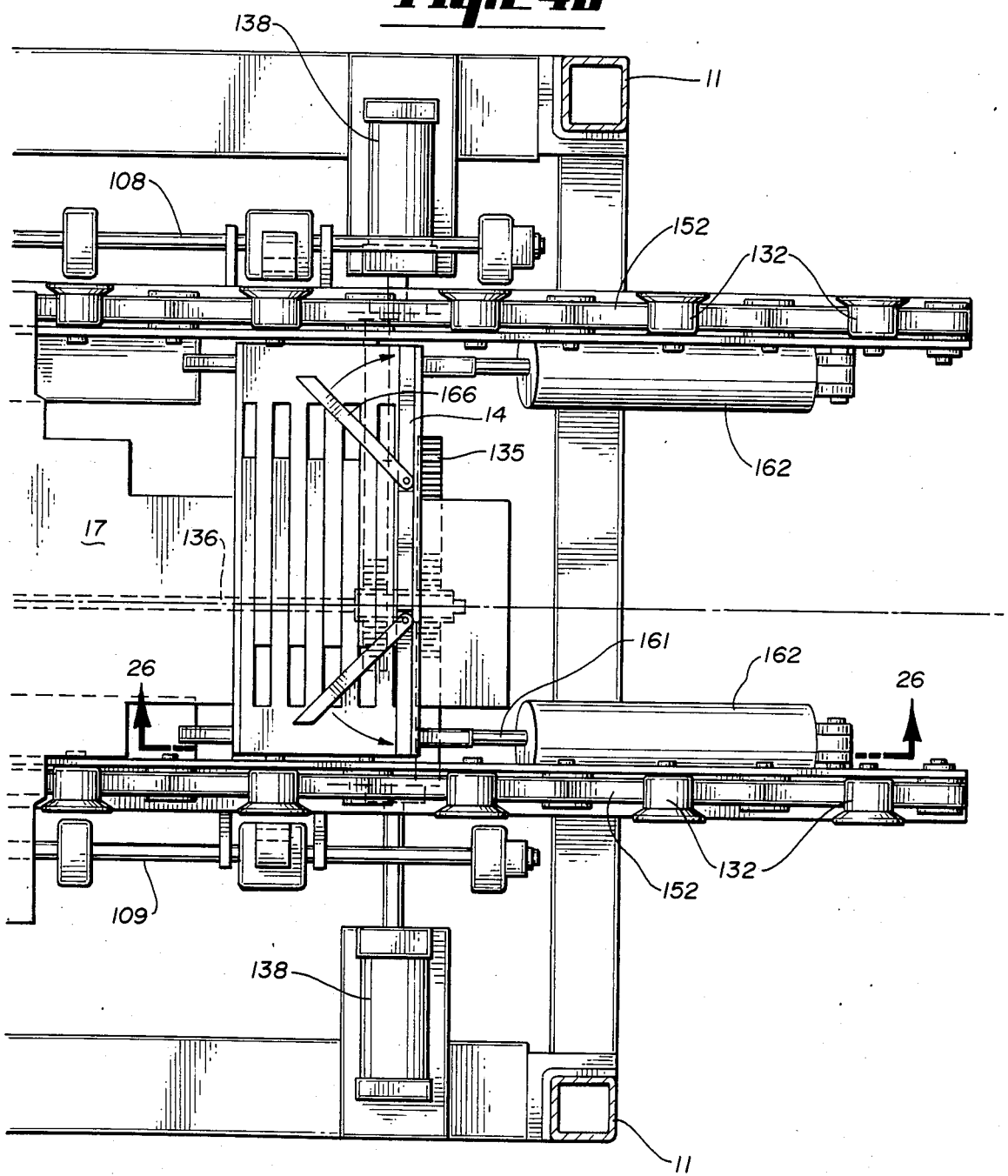
FIG. 24, comprised of Figure sections 24a and 24b is a top plan view of the apparatus bed showing the conveyor and the exterior back support as taken along the line 24—24 of FIG. 2.

The main exterior bottom support panel 14 in the preferred embodiment is pivotally secured to a portion of the apparatus frame about the laterally extending pivot 160. The main exterior bottom support panel 14 is connected with this pivot by the connecting arm 159. The panel 14 is pivotally moved about the pivot 160 by the drive cylinder 162 and the connecting rod 161. As shown in FIG. 24*b,* a drive cylinder 162 and connecting rod 161 are positioned on each side of the panel 14. The panel 14 includes a central portion 164 having a plurality of spaced fingers or sections extending outwardly toward each end. Pivotally secured at the outermost end of these sections 164 is an extension panel 166. This extension panel 166 includes a plurality of inwardly extending fingers or portions which extend into the recessed portions between the outwardly extending sections of the central portion 164. The inner ends of the extension panel 166 are pivotally secured to and slidably connected with the outer ends of the section 164 through the pivot rod 165. The pivot rod 165 extends through the inner ends of the extension panel fingers and is slidably disposed in the elongated slot 168 formed in each of the fingers of the central portion 164.

The sections 166 are biased inwardly by appropriate spring or other bias members to the position illustrated by the solid lines in FIG. 28. Then, as the appliance is conveyed into foaming position by the conveyor, the bottom surface 171 of the appliance will engage the outermost edge of the panel 166 and pivot it downwardly and outwardly about the pivot 165. When this position is reached, the panel section 166 will be in the position illustrated by the broken line 166*a.* As shown, this panel section supports the entire bottom surface 171 of the appliance. The panel section 166, in this position, is supported by the support member 169 which is movable inwardly and outwardly with the frame portions 133.

Figure 29:
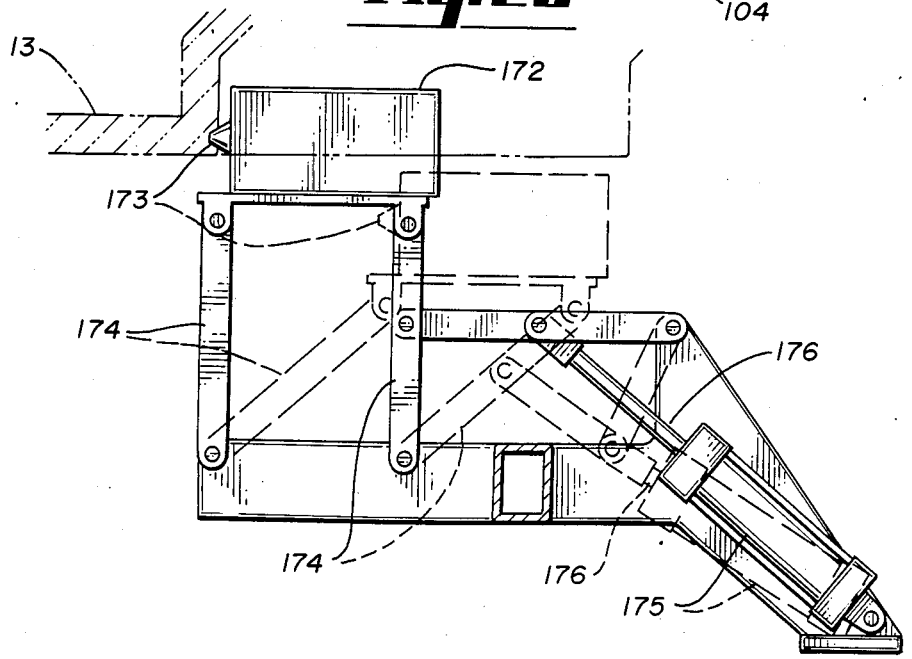
FIG. 29 is a left elevational detail of the foam head or nozzle illustrating the nozzle in both an operative position as shown by solid lines and a lowered, inoperative position as shown by phantom lines.

The mechanism for supplying foam to the interior of the appliance walls is illustrated in FIG. 29. In the preferred embodiment, this mechanism includes a foam head 172 which is supported and movable between an upwardly disposed operative position illustrated by the solid lines and a lowered, inoperative position illustrated by the broken lines. The foam head 172 is supported by a pair of parallel links 174, 174 which are pivotally secured to the foam head 172 and to the main frame of the apparatus. The links 174 are driven by a power cylinder 175 and a connecting link 176. The foam head 172 includes a foam nozzle 173 which is pressed into engagement with an opening in the wall of the appliance for introducing foam into the cavity between the inner and outer walls of the appliance. It is also contemplated that the foam head 172 could be mounted so that it is swung laterally into foaming position rather than upwardly into such position.

Having described the structural features and elements of the above apparatus in detail, the operation of the apparatus with respect to both a production sequence and a model change sequence can be understood as follows.

For a model change sequence in which the foaming apparatus is converted from a first position having the ability to foam one appliance to a second position with the ability to foam a different model appliance, the base mounting frame portions 133 (FIG. 23) are first moved toward the longitudinal center to the minimum width position. This movement is caused by actuation of the power cylinders 138 positioned at each corner of the apparatus. This inward movement of the frame portions 133 carries with it the exterior side panel members 15 and 16, the rollers 132 and roller supporting structure, and the outer extension panels of the exterior bottom panel 14. The new width is then selected by appropriate rotation of the width adjustment turrets 145 (FIGS. 22 and 23). As a result of this rotation, the desired stop member 144 is disposed in position for engagement by the positioning rod 142. The frame portions 133, and the various apparatus carried with it, are then moved outwardly by the cylinders 138 to the new width position defined by engagement between the positioning rod 142 and the newly positioned stop member 144. This completes the model change sequence for the base section of the apparatus.

Next, the plug section of the apparatus is changed to match the completed change in the base section. The first thing which is done is to transfer the previously used plug 20 from the plug carrier 44 and ram 48 to the storage ring 25. This is accomplished by activating the plug transfer cylinder 71 (FIG. 2) on the left side of the apparatus as viewed in FIG. 2 to shift the plug attachment shuttle pins 58 (FIGS. 8 and 9) from the plug carrier 44 to the storage ring 25. All of the plugs 20 are then mounted on the storage rings 25. It should be noted that the rings 25 were positioned so that an open spot was in position for the transfer of the plug from the carrier.

Next, the shot pin cylinder 39 (FIGS. 4 and 5) is activated to retract the shot pin 38. This disengages the turret storage rings 25 and permits the same to be rotated. The indexing motor 32 is activated to rotate the turret storage rings 25 to a location in which a new plug, which corresponds to the previously positioned base section, is appropriately positioned for transfer to the plug carrier 44. When this position is reached, the shot pin cylinder 39 is extended to engage the shot pin with the appropriate indexing recess 36 in the storage rings 25. This secures the rings 25 and thus the selected plug 20 in position for transfer to the plug carrier 44.

The selected plug 20 is then transferred to the plug carrier 44 by activating the plug transfer cylinder 71 (FIG. 2) on the right hand side of the apparatus as shown in FIG. 2. This transfers the shuttle pins 58 from connection with the storage rings 25 to connection with the carrier flanges 52 on the plug carrier 44. The model change for the plug section of the apparatus is now complete.

It is contemplated that the above described model change sequence for both the base section and the plug section can be conducted simultaneously or sequentially, whichever is desired. It is also contemplated that the various cylinder actuations to accomplish the model change can be controlled electronically or manually. Also, many of the various movements of portions of the apparatus during a model change can be either manual or power assisted. The total time for the model change sequence described above is reduced dramatically from that of prior art devices. It is contemplated that the model change sequence of the present invention can be totally accomplished in a period of less than one minute.

After the apparatus has been set to accept a particular model of appliance, the production sequence is initiated. First, the exterior bottom panel 14 is moved into its operative position as illustrated by the solid lines in FIG. 26. In this position, the retractable outer panel sections 166 are biased inwardly as shown by the solid lines in FIG. 28 so as to provide clearance for movement of the appliance into foaming position.

Next, the appliance is moved into foaming position by the conveyor mechanism. This is accomplished by raising the roller mounting bar 141, and thus the rollers 132, to a position slightly above the upper surface of the exterior back panel 17 so that the appliance 13 can be engaged by the rollers 132. The appliance 13 is then moved into foaming position by the rollers 132 until it stops against the exterior bottom support panel 14. The roller mounting bar 141 is then lowered as a result of retraction of the cylinders 140 so that the exterior back of the appliance 13 rests on the back exterior panel 17.

The plug carrier 44 which carries the selected plug 20 is then lowered by the ram cylinder 48. The plug 20 enters the interior of the appliance until the interior back panel 72 engages the interior back surface of the appliance 13. After this engagement has been made, the cylinder 85 (FIGS. 11, 13 and 14) is actuated to move the mounting plates 78 and 79 downwardly. This movement in turn causes the links 80 to be straightened to the position illustrated in FIGS. 13 and 14, thereby resulting in outward, supporting movement of the panel members 74, 75 and 76 against the inner side, top and bottom surfaces of the appliance, respectively.

The exterior top panel 89 and side panels 15 and 16 then close. This is accomplished by retraction of the cylinder 98 (FIGS. 16, 17 and 18). Retraction of this cylinder 98 results in initial inward pivotal movement of the panel 89 about the pivot point 91. After it has been pivoted inwardly against the exterior top surface of the appliance 13, further retraction of the cylinder 98 results in the latching bar extending into the latch opening 106, thereby locking the panel 89 into position for foaming.

The exterior side panels 15 and 16 are then pivoted into foaming position and locked into place by appropriate actuation of the panel movement cylinder 115 and the latching cylinders 125. First the cylinders 125 are extended to thereby rotate the eccentric 119 and move the latching bar 116 upwardly. The cylinder 115 is then retracted to move the pin 112 downwardly. This results in corresponding inward pivotal movement of the exterior side panels 15 and 16 about the pivots 108 and 109, respectively and into supporting engagement with the appliance. Retraction of the cylinders 125 then causes appropriate rotation of the eccentrics 119 and downward movement of the latch hook 116 to lock the same into position with the locking pins 126. The apparatus is then totally locked into position and ready for foaming.

Next, the foam head 172 (FIG. 29) and foam nozzle 173 are moved upwardly into foaming position by actuation of the cylinder 175. The foam is then injected by appropriate means known in the art and allowed to cure under appropriate heat and other conditions. After the prescribed cure time has elapsed, the exterior side panels 15 and 16 and exterior top panel 89 are unlatched and moved out of engagement with the appliance by reversing the procedure described above. The interior support panels 74, 75 and 76 are also collapsed so that they move out of engagement with their respective walls. The plug 20 is then withdrawn from the interior of the appliance by the power cylinder 48. When fully raised, the exterior bottom panel 14 is moved downwardly by actuation of the cylinder 162 (FIG. 26). The roller mounting bar 141 is then raised and the appliance is moved out of the apparatus. The exterior bottom panel 14 is then raised and the apparatus is ready for receiving a new appliance for foaming.

Similar to the model change sequence previously described, it is contemplated that the foaming procedure and sequence can be controlled electronically or manually. Also, it is contemplated that the various movements of the structural components during the foaming procedure can be either manually performed or power assisted.

Although the description of the preferred embodiment has been quite specific, it is contemplated that various modifications, both structurally and procedurally, could be made without deviating from the spirit of the present invention. Accordingly, it is intended that the scope of the present invention be dictated by the appended claims, rather than by the description of the preferred embodiment.

I claim:

1. An apparatus for supporting the walls of an appliance or the like during foaming comprising:
   an apparatus frame;
   a support bed connected with said apparatus frame for supporting said appliance during foaming;
   a pair of exterior side support panels connected to a portion of said apparatus frame and movable relative to said support bed between a retracted position and a foaming position in which said exterior side support panels are in supporting engagement with the exterior surface of a corresponding pair of appliance walls;
   a plurality of plugs each having at least a pair of interior support surfaces for supporting engagement with the interior surface of a corresponding pair of appliance walls;
   plug carrier means connected with said apparatus frame for moving a selected one of said plurality of plugs between a first position in which said plug is fully inserted within the interior of the appliance and a second position in which said plug is fully withdrawn from the appliance;
   plug storage means connected with said apparatus frame for storing those plugs other than said selected one; and
   plug transfer and connection means for selectively transferring and connecting said selected plug either from said plug storage means to said plug carrier means or from said plug carrier means to said plug storage means.

2. The apparatus of claim 1 wherein said plug storage means includes indexing means for moving said selected one of said plurality of plugs into a position for connection with said plug carrier means.

3. The apparatus of claim 2 wherein said plug storage means includes a rotatable member.

4. The apparatus of claim 3 wherein said plug storage means includes a pair of spaced rotatable members.

5. The apparatus of claim 2 wherein said plug storage means includes a plug storage turret.

6. The apparatus of claim 5 wherein said plug storage turret includes a pair of laterally spaced storage rings and said indexing means includes means for rotating said storage rings.

7. The apparatus of claim 6 wherein said connection means includes a plurality of first connection openings positioned along the peripheral edge of each of said storage rings and a plurality of second connection openings in said plug carrier means.

8. The apparatus of claim 6 wherein each of said storage rings has a generally circular configuration.

9. The apparatus of claim 6 wherein said means for rotating said storage rings includes first gear means connected with each of said storage rings, second gear means operatively engaged with said first gear means and an indexing motor for selectively rotating said second gear means.

10. The apparatus of claim 9 wherein said indexing means includes a plunger assembly connected with said apparatus frame and a plurality of alignment portions selectively engageable by said plunger assembly.

11. The apparatus of claim 9 including pin actuating means for selectively moving said pin means into connecting engagement with either said first connecting openings or said second connecting openings.

12. The apparatus of claim 11 wherein said pin means comprises a plurality of shuttle pins.

13. The apparatus of claim 12 wherein said pin actuating means includes a power cylinder positioned on each side of said apparatus.

14. The apparatus of claim 1 wherein said connection means includes a connection assembly associated with each of said plugs.

15. The apparatus of claim 14 wherein said connection means includes a plurality of first connection openings in said plug storage means and a plurality of second connection openings in said plug carrier means and wherein said connection assembly includes pin means selectively movable between connecting engagement with said first connection openings and connecting engagement with said second connection openings.

16. The apparatus of claim 1 wherein said plug carrier means includes a plug carrier base and a power assist means for moving said plug carrier base between a first position corresponding to said first position of said selected plug and a second position corresponding to said second position of said selected plug.

17. The apparatus of claim 16 wherein said plug carrier means further includes guide means for guiding the movement of said plug carrier base between its first and second positions.

18. The apparatus of claim 1 including expansion means for moving said interior support panels between said retracted position and said foaming position.

19. The apparatus of claim 18 wherein said expansion means includes a frame member, a plurality of link members connected between said frame member and said support panels and means for moving said frame member relative to said support panels.

20. The apparatus of claim 1 wherein said pair of interior support panels are interior side support panels and wherein each of said plugs further includes an interior back support panel and interior top and bottom support panels.

21. The apparatus of claim 20 wherein each of said plugs further includes an exterior top support panel and means for moving the same between a retracted position and a foaming position in which said exterior top support panel is in supporting engagement with the exterior top surface of the appliance.

22. The apparatus of claim 1 wherein said pair of interior support panels are interior side support panels and wherein each of said plugs further includes an interior back support panel and interior top and bottom support panels and wherein each of said plugs further includes an exterior top support panel and means for moving the same between a retracted position and a foaming position in which said exterior top support panel is in supporting engagement with the exterior top surface of the appliance.

23. The apparatus of claim 1 wherein said support bed is expandable and retractable to accommodate appliances with different exterior back dimensions and wherein said apparatus further includes means for expanding said support bed.

24. The apparatus of claim 1 including means for moving said exterior side support panels between a retracted and a foaming position.

25. The apparatus of claim 24 including latch means associated with each of said side support panels for retaining said side support panels in foaming position, said latch means being engageable with corresponding latch receiving means associated with each of said plugs.

26. The apparatus of claim 1 including an exterior bottom support panel movable between a retracted position and a foaming position in which said bottom support panel is in supporting engagement with the exterior surface of the appliance.

27. The apparatus of claim 26 wherein said exterior bottom support panel is expandable and retractable to accommodate appliances with different exterior bottom dimensions.

28. The apparatus of claim 27 including means for moving said exterior bottom support panel between said retracted position and said foaming position.

29. The apparatus of claim 1 including means for moving an appliance into a foaming position.

* * * * *